(12) United States Patent
Kelly et al.

(10) Patent No.: US 11,274,707 B2
(45) Date of Patent: *Mar. 15, 2022

(54) CUSTOMIZABLE LIGHT-UP DEVICE

(71) Applicant: LIGHTUPTOYS.COM LLC, Sellersburg, IN (US)

(72) Inventors: Christopher D. Kelly, New Albany, IN (US); Joshua C. Kelly, Sellersburg, IN (US); Max Armendariz Lalama, Georgetown, IN (US); Ariel Macaulay Bruton, Louisville, KY (US)

(73) Assignee: LightUpToys.com LLC, Sellersburg, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/988,990

(22) Filed: Aug. 10, 2020

(65) Prior Publication Data

US 2021/0332858 A1  Oct. 28, 2021

Related U.S. Application Data

(63) Continuation-in-part of application No. 16/124,979, filed on Sep. 7, 2018, now Pat. No. 10,738,972, which
(Continued)

(51) Int. Cl.
*A63H 33/00* (2006.01)
*F21V 33/00* (2006.01)
(Continued)

(52) U.S. Cl.
CPC ............. *F16D 7/021* (2013.01); *A63H 33/00* (2013.01); *A63H 33/042* (2013.01);
(Continued)

(58) Field of Classification Search
CPC ........ A63H 33/00; A63H 33/042; F21V 33/008
See application file for complete search history.

(56) References Cited

U.S. PATENT DOCUMENTS 3,644,725 A * 2/1972 Lochridge, Jr. ........ F21S 10/005
362/556
4,097,917 A * 6/1978 McCaslin ............ G02B 6/0005
362/565
(Continued)

*Primary Examiner* — Eugene L Kim
*Assistant Examiner* — Alyssa M Hylinski
(74) *Attorney, Agent, or Firm* — Scott R. Cox; Jessica C. Ronald

(57) ABSTRACT

An apparatus that includes a housing containing a motor that is electrically connected to a power source. An enclosed motorized assembly is connected to the housing and contains secure points located in an outer surface thereof and LEDs therein. An object is affixed to the motorized assembly and contains insertion points. A slip ring is secured around a motor shaft of the motor and electrically connects to a first conductive plate that is secured within the housing. The first conductive plate is further electrically connected to the LEDs. A second conductive plate is electrically connected to the motor shaft and the LEDs. A plurality of extension elements include a first and second end, wherein the first end is secured to the secure points and the plurality of extension elements radiate or transmit light from the LEDs.

20 Claims, 23 Drawing Sheets

Related U.S. Application Data is a continuation-in-part of application No. 14/684,479, filed on Apr. 13, 2015, now abandoned.

(51) Int. Cl.

| | |
|---|---|
| A63H 33/04 | (2006.01) |
| F16D 7/02 | (2006.01) |
| F21V 8/00 | (2006.01) |
| F21V 14/02 | (2006.01) |
| F21V 23/04 | (2006.01) |
| F21V 23/00 | (2015.01) |
| F21Y 115/10 | (2016.01) |

(52) U.S. Cl.
CPC .......... *F21V 14/025* (2013.01); *F21V 23/003* (2013.01); *F21V 23/04* (2013.01); *F21V 33/008* (2013.01); *G02B 6/001* (2013.01); *F21Y 2115/10* (2016.08)

(56) References Cited

U.S. PATENT DOCUMENTS

| | | | | |
|---|---|---|---|---|
| 5,387,146 | A * | 2/1995 | Smith | A63H 33/22 362/565 |
| 5,536,195 | A * | 7/1996 | Stamos | A63H 33/18 446/219 |
| 5,609,509 | A * | 3/1997 | Stamos | A63H 1/06 446/219 |
| 6,592,423 | B1 * | 7/2003 | Boyle | A63H 33/22 362/323 |
| 6,645,038 | B2 * | 11/2003 | Trotto | A63H 33/22 40/547 |
| 7,361,074 | B1 * | 4/2008 | Periman | A63H 5/00 362/192 |
| 7,771,247 | B2 * | 8/2010 | Kessler | A63H 33/26 446/242 |
| 8,864,546 | B1 * | 10/2014 | Capriola | A63H 33/042 446/91 |
| 10,738,972 | B1 * | 8/2020 | Kelly | A63H 33/008 |
| 2003/0174494 | A1 * | 9/2003 | Chernick | F21S 10/00 362/84 |
| 2004/0004828 | A1 * | 1/2004 | Chernick | F21S 10/00 362/35 |
| 2004/0032731 | A1 * | 2/2004 | Coleman | F21S 10/007 362/109 |
| 2006/0034096 | A1 * | 2/2006 | Chernick | G02B 6/04 362/551 |
| 2006/0084357 | A1 * | 4/2006 | Rosen | A63H 33/107 446/91 |
| 2007/0014099 | A1 * | 1/2007 | Lin | A63B 43/06 362/35 |
| 2010/0124867 | A1 * | 5/2010 | Kessler | A47G 33/06 446/242 |
| 2013/0309940 | A1 * | 11/2013 | Miyako | A63H 33/22 446/485 |
| 2015/0198307 | A1 * | 7/2015 | Brand | G02B 6/0006 362/555 |
| 2015/0336020 | A1 * | 11/2015 | Levy | A63H 13/00 446/485 |
| 2016/0074759 | A1 * | 3/2016 | Kelly | A63H 1/24 446/242 |

* cited by examiner

CUSTOMIZABLE LIGHT-UP DEVICE

CROSS REFERENCE TO RELATED APPLICATIONS

This application is a continuation-in-part application of and claims priority to application Ser. No. 16/124,979, filed on Sep. 7, 2018, which is a continuation-in-part of and claims priority to application Ser. No. 14/684,479, filed on Apr. 13, 2015.

FIELD OF INVENTION

The present device relates to the field of entertainment devices, more particularly, to the field of entertainment devices that utilize electronics, lighting, location, and communication system(s).

BACKGROUND OF THE INVENTION

There is a need for devices that electronically rotate and utilize electronics, lighting, location, and communication systems to activate certain electronic features of the device when coming into close proximity with a sender.

In addition, electronic devices that rotate present safety risks to users. Accordingly, there is also a need for integration of a safety mechanism in these devices, such as a slip-clutch, that automatically stops the rotating portion of the device upon touch of a user. More specifically, what is needed is a slip clutch that allows the device to have the same motor with the same acceleration and top speed, yet still limit the maximum torque applied to the rotating portion of the device. This ensures that the motor is protected from overheating in the event of a stalled or stopped rotating portion.

BACKGROUND OF THE INVENTION

There is disclosed an apparatus including a housing that contains a motor, which is electrically connected to a power source, an enclosed motorized assembly connected to the housing and containing secure points located in an outer surface thereof and LEDs therein, a slip ring secured around a motor shaft of the motor, a first conductive plate electrically connected to the slip ring and the LEDs, an object affixed to the motorized assembly and containing insertion points, wherein the object radiates or transmits light from the LEDs and wherein the object and motorized assembly rotate about an axis, a second conductive plate electrically connected to the motor shaft and the LEDs, and a plurality of extension elements containing a first end and a second end, wherein the first end is secured to the secure points of the enclosed motorized assembly and wherein the extension elements radiate or transmit light from the LEDs.

DETAILED DESCRIPTION

Figure 1:
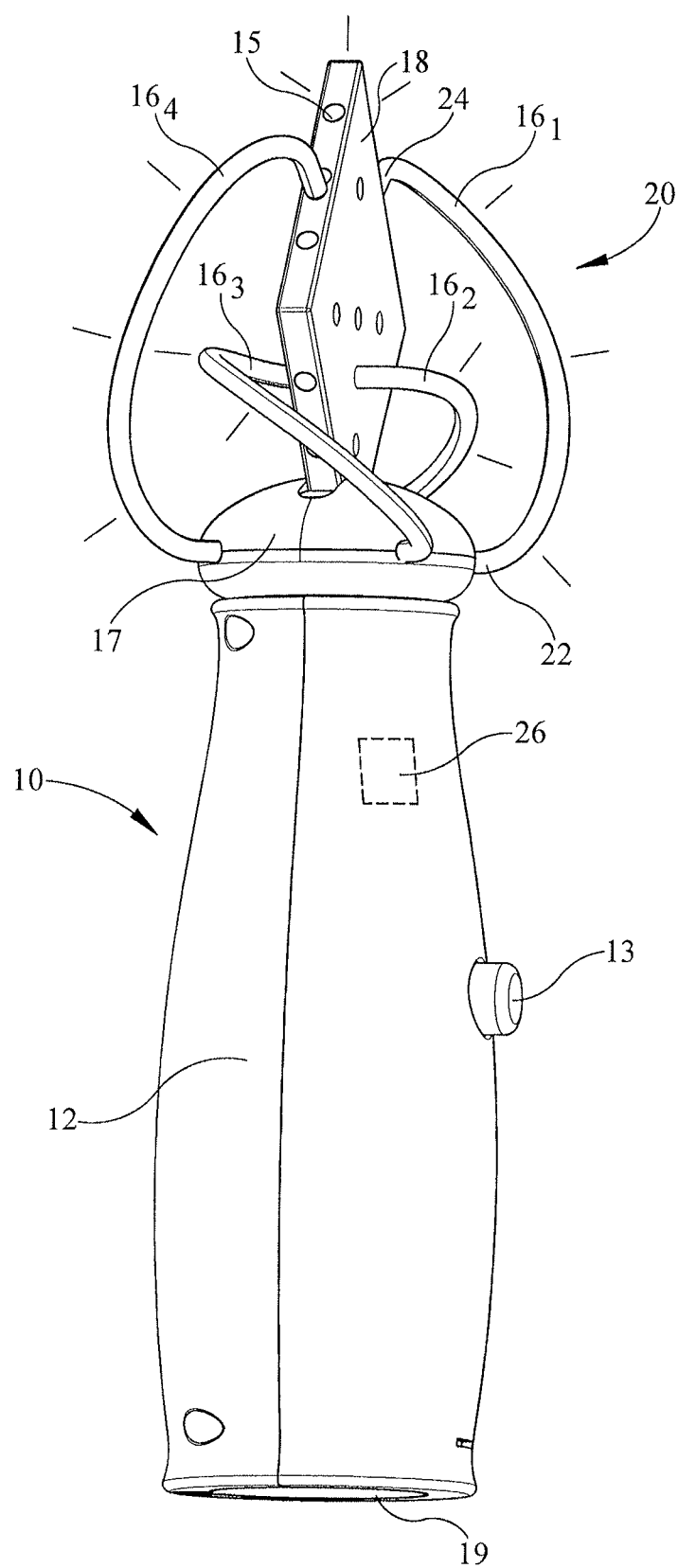
FIG. 1 is a perspective view of an embodiment of a handheld customizable light-up device consistent with the description herein.
Figure 2:
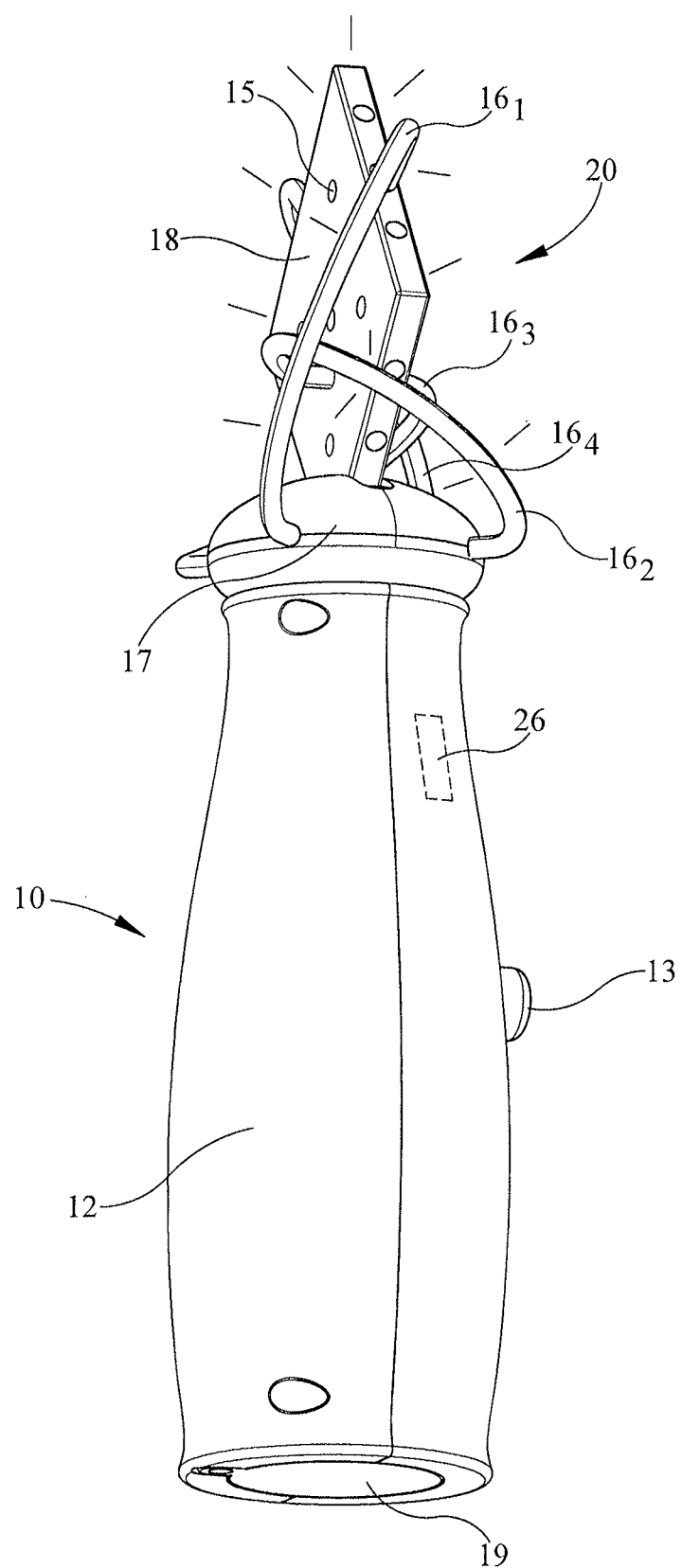
FIG. 2 is a first bottom perspective view of the handheld customizable light-up device of FIG. 1.
Figure 3:
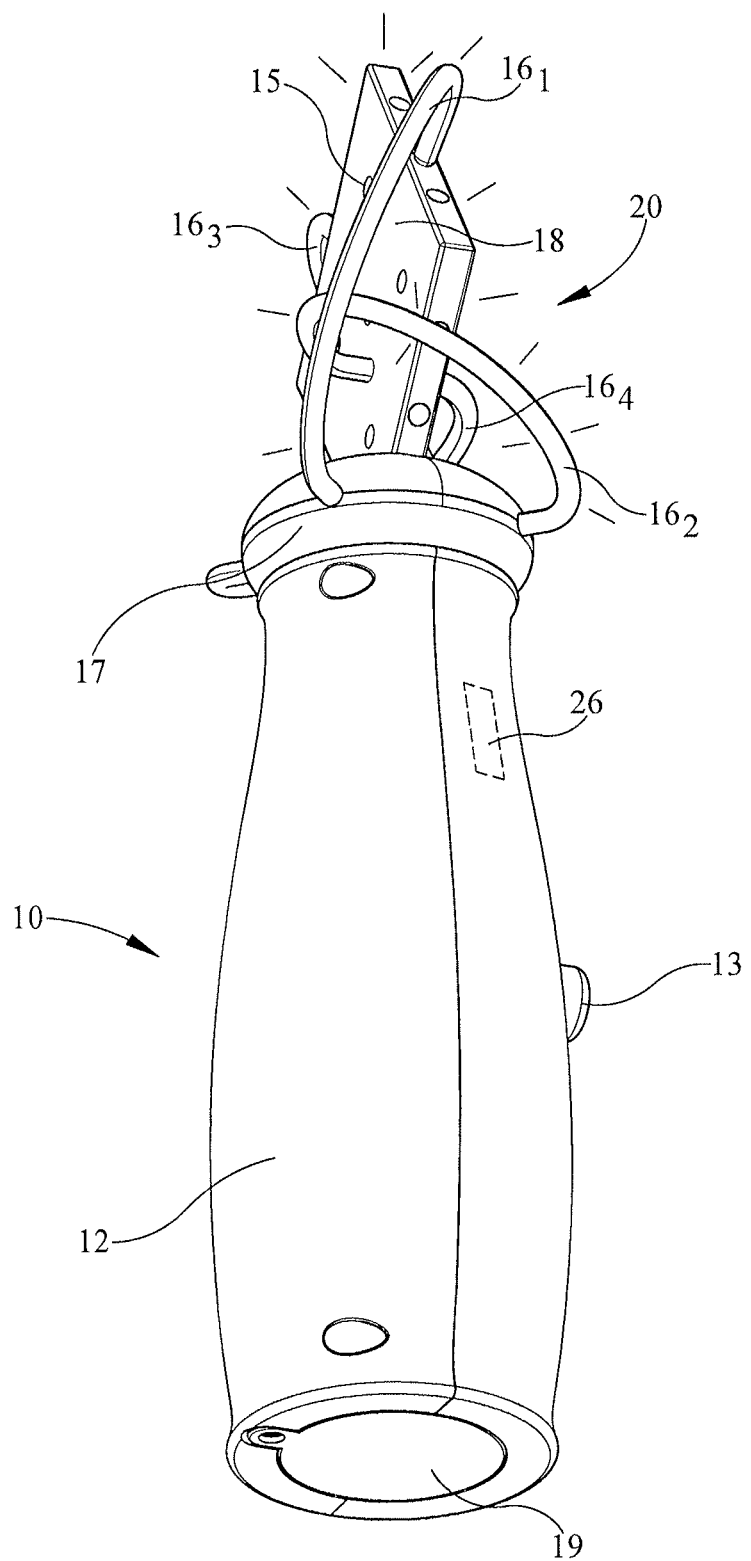
FIG. 3 is a second bottom perspective view of the handheld customizable light-up device of FIG. 1.
Figure 4:
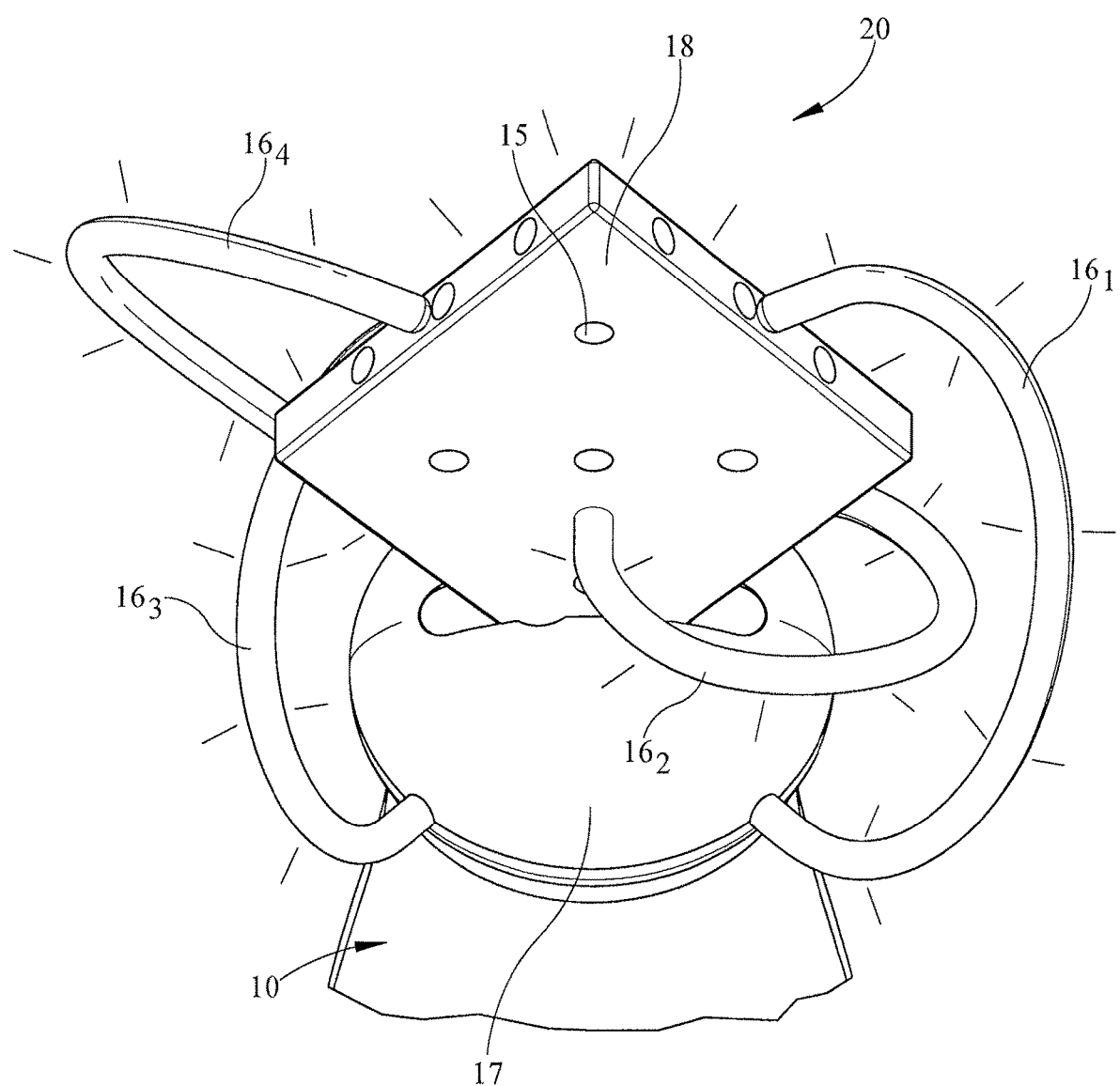
FIG. 4 is a first partial top perspective view of the handheld customizable light-up device of FIG. 1.
Figure 5:
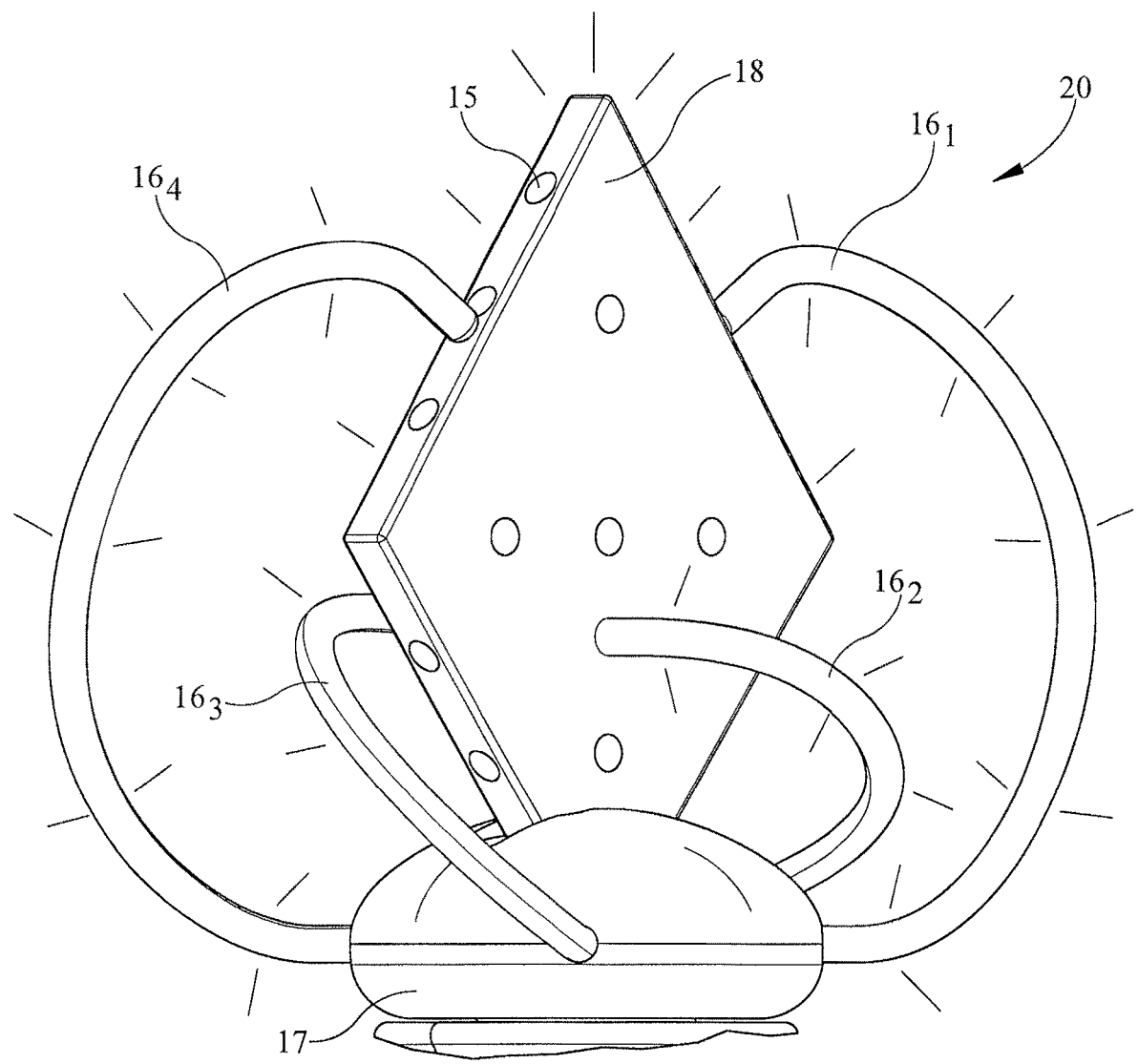
FIG. 5 is a second partial front view of the handheld customizable light-up device of FIG. 1.
Figure 6:
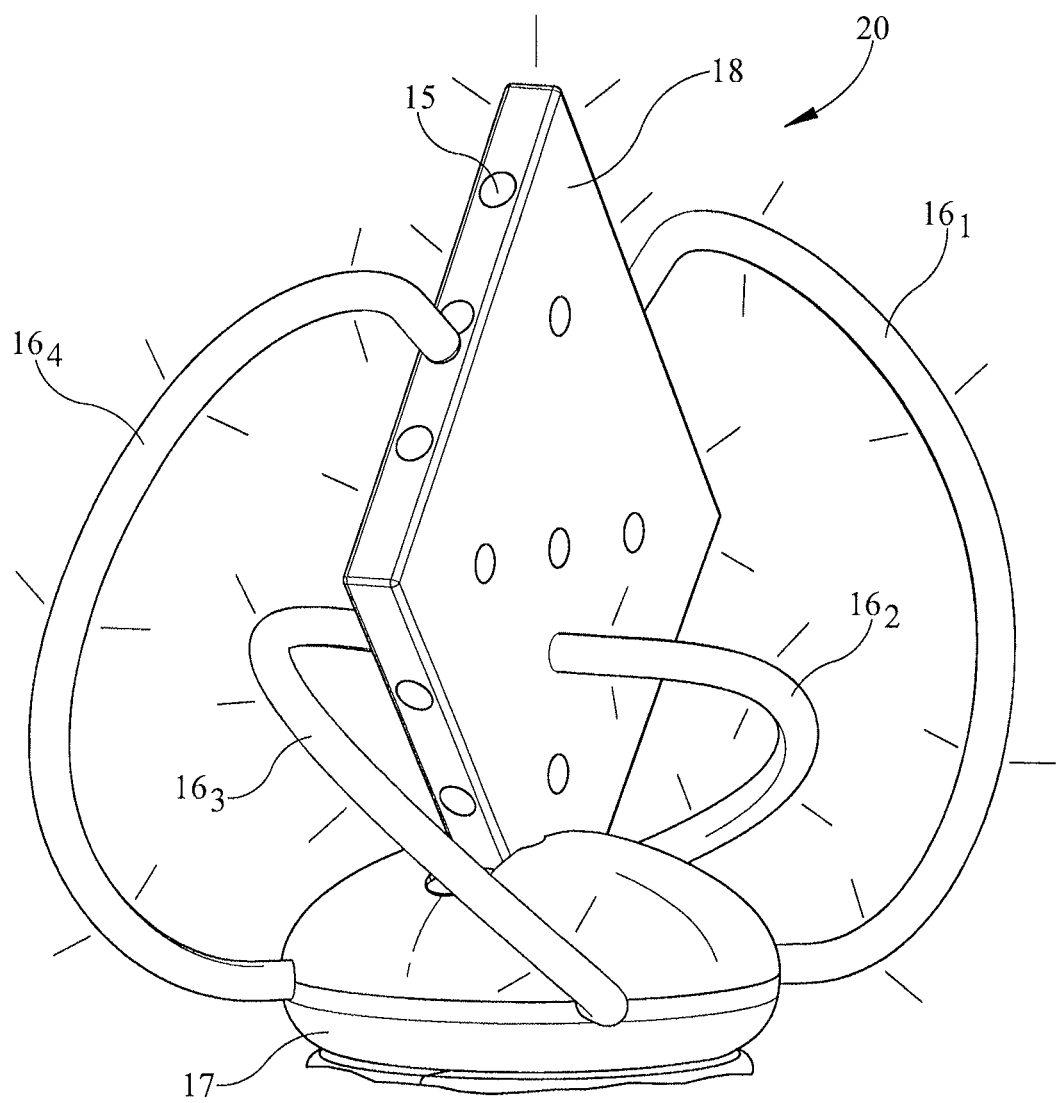
FIG. 6 is a third partial perspective view of the handheld customizable light-up device of FIG. 1.
Figure 7:
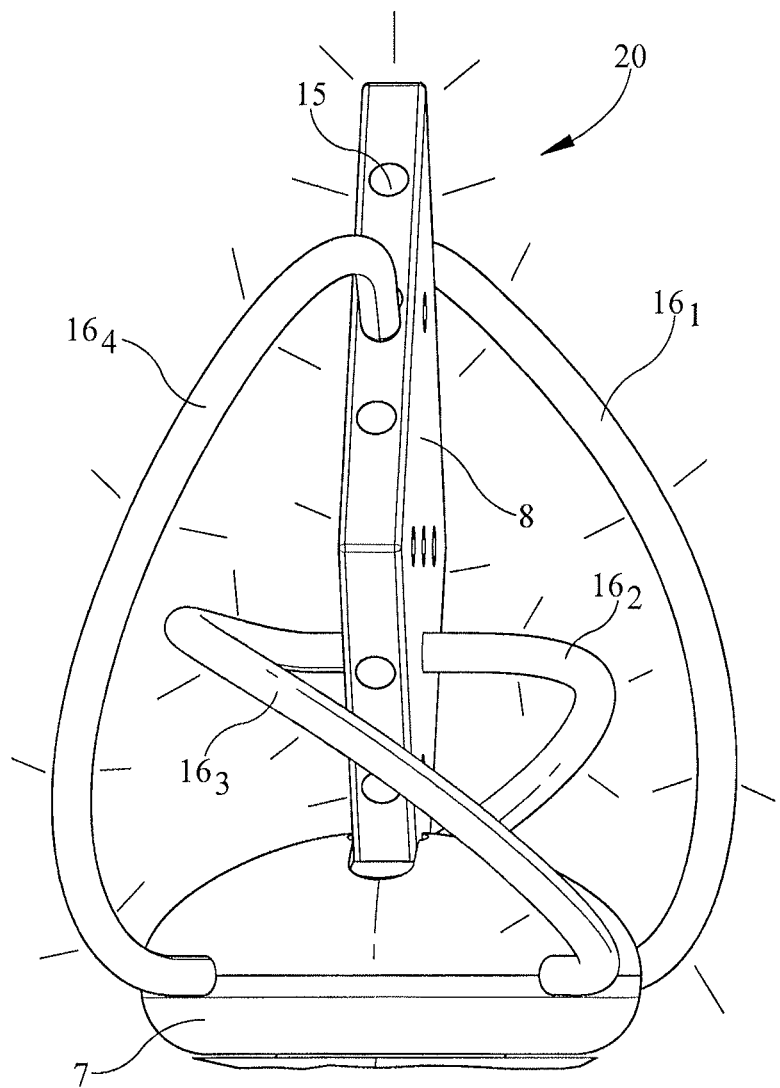
FIG. 7 is a partial side view of the handheld customizable light-up device of FIG. 1.
Figure 8:
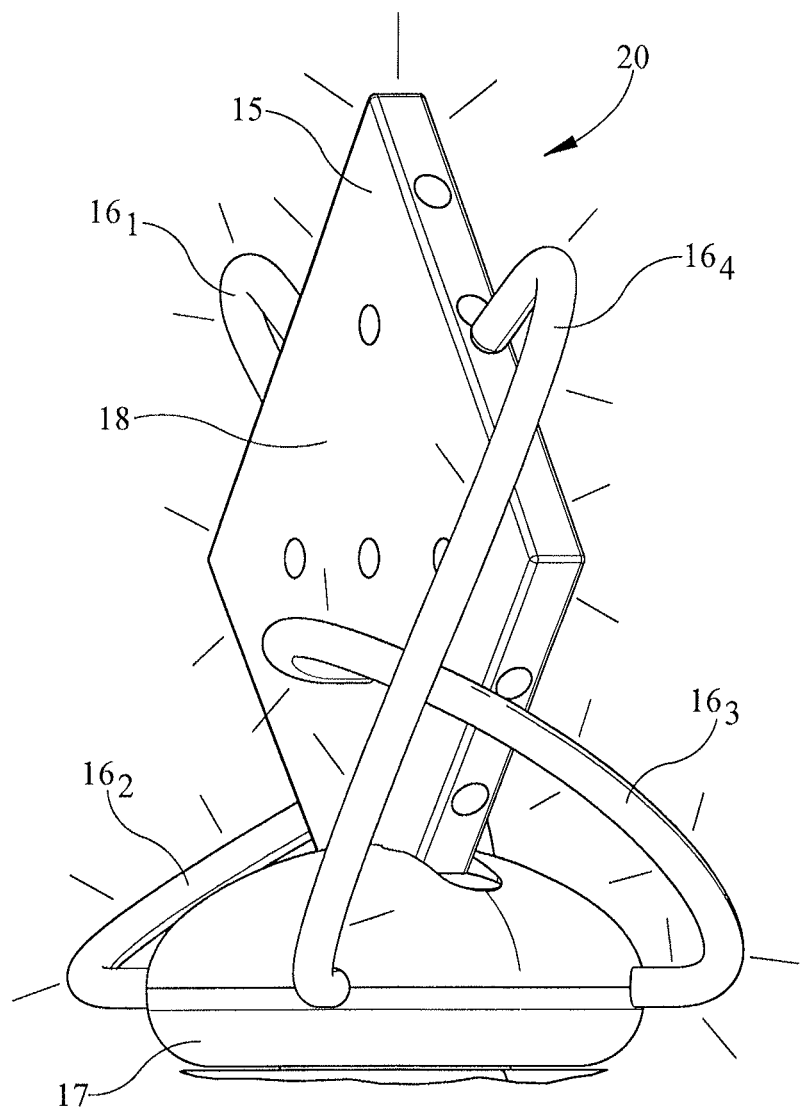
FIG. 8 is a partial side view of the handheld customizable light-up device of FIG. 1.
Figure 9:
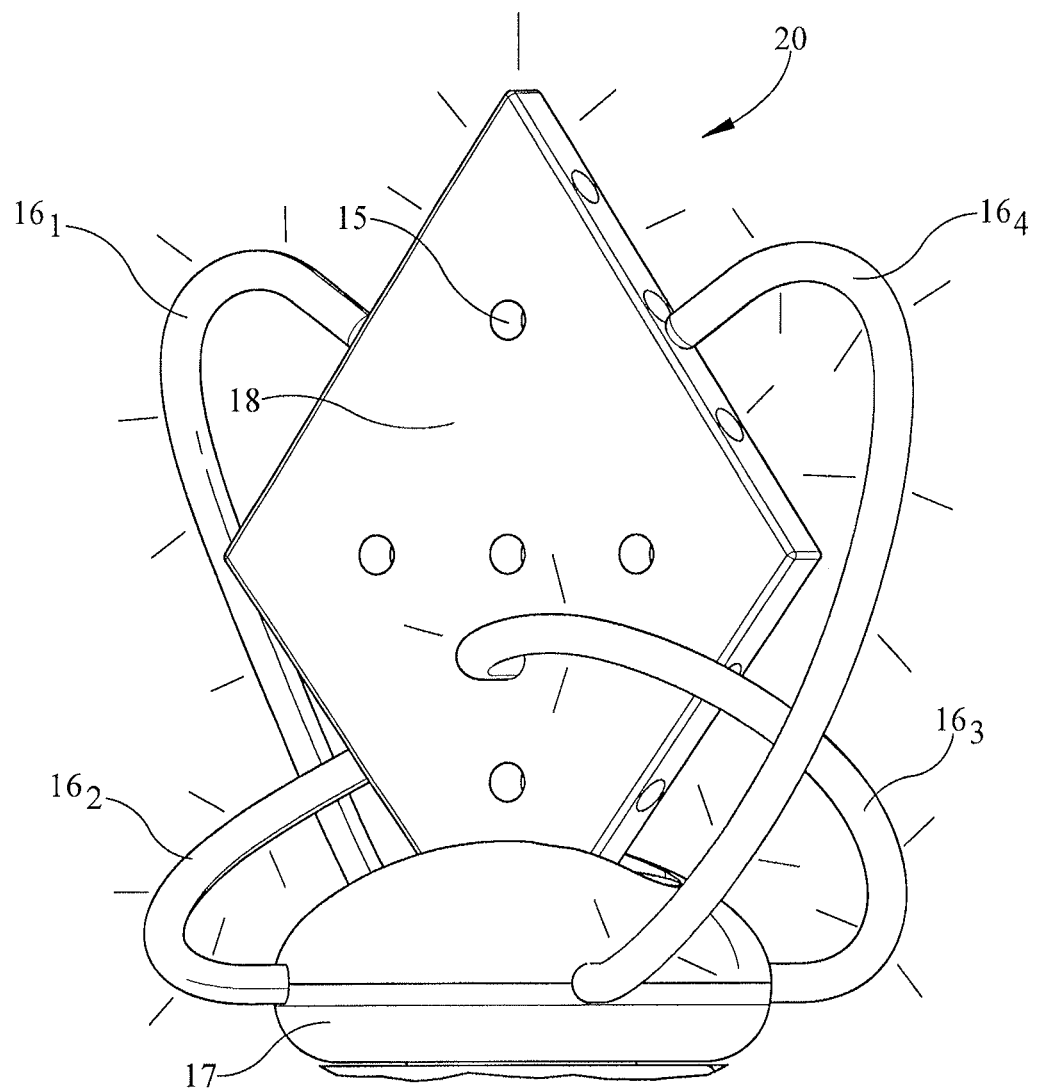
FIG. 9 is a partial rear view of the handheld customizable light-up device of FIG. 1.

FIGS. 1-9 illustrate one embodiment of a handheld customizable light-up device 10. More specifically, FIGS. 1-3 illustrate the device 10 in its entirety, including both a housing 12 that may function as a handle or grip for a user and an upper portion 2 affixed to the housing 12. FIGS. 4-9 illustrate the top portion 20 in greater detail. The housing 12 may be constructed of multiple pieces that are affixed together, for example by one or more screws. The housing 12 may additionally include a user-actuated control 13 that functions as an on/off switch for the device 10. Although illustrated as a button in FIGS. 1-3, this is not intended to be limiting, as the user-actuated control 13 may in the form of a button, slide, toggle switch, or any other mechanically actuatable device capable of activating or deactivating the device 10. The user-activated control 13 may be coupled with circuitry (not illustrated) disposed within the housing 12, and when the user-actuated control 13 is activated or deactivated by a user, this circuitry is closed or opened. Such circuitry may also connect the power source (not illustrated), such as a battery, located within a closable power source compartment 19 with the user-actuated control 13, a motor (not illustrated) contained within a motorized assembly 17, and one or more light emitting diodes (LEDs). The one or more LEDs may include a multicolor LED, red LED, green LED, blue LED, yellow LED, purple LED, white LED, IR LED, UV LED, or any combination thereof.

In some embodiments, the user-actuated control 13 may be capable of changing an illumination pattern of the one or more LEDs. Such a pattern of illumination may include, but is not limited to, a constant static color, a color that fades from a first color to a second color, a color that abruptly changes from a first color to a second color, multicolor, a blinking pattern, or a dimming pattern. In addition to, or in place thereof, the user-actuated control 13 may be replaced with a software or signal controlled switch that is controlled by an internal controller and circuitry (described in detail herein) of the housing 12 and which may be communicatively activated by a remote device. The switch or other circuit may also incorporate activation through embedded instructions and or receipt of activation signals received by a communication device 26 and included electronics and circuitry. For example, the communication device 26 may include a receiver for receiving signals, which may activate the illumination features of the device. The switch or other circuit may further incorporate proximity detection devices, such as for example RFID or other types of electronics, which senses location, proximity or other wireless instructions, which would indicate or instruct illumination.

Although not shown in the exemplary embodiment illustrated in FIGS. 1-9, in some embodiments the housing may be constructed of a transparent or semi-transparent material; and the housing 12 may, in some instances, contain one or more LEDs capable of illuminating the housing.

The upper portion 20 of the device 10, illustrated in detail in FIGS. 4-9, may include a motorized assembly 17 that may be configured to rotate about an axis that runs vertically through the center of the housing 12. The motorized assembly 17 may contain within it one or more LEDs (not illustrated) configured to illuminate the upper portion 20 of the device 10. Affixed to the motorized assembly may be an object 18 that is capable of radiating or transmitting light, or otherwise being illuminated. In some embodiments, the object 18 may be glass, plexiglass, acrylic, resin, or a combination thereof. As illustrated in the embodiment illustrated in FIG. 1-9, the object 18 is in the shape of a diamond; however, this is not intended to be limiting as any number of other shapes may be utilized.

In other embodiments the object 18 may be in the shape of: a star; crystal; sphere; rod; staff; blade; disk; wand; multi-sided polyhedron; geometric shape; triangle; quadrilateral; pentagon; hexagon; septagon; octagon; or polygon of any number of sides. In still other embodiments, the object may be in other commonly recognizable forms, including but not limited to: a character; caricature, celebrity; logo; symbol; rocket; airplane; car; animal; bug; alien; boat; vehicle; submarine; plant; rock; rock formation; body part; machine; sword; shield; knife; gun; pistol; toy; toy shield; doll; figurine; helicopter; rocket; quad copter; jewelry; sports balls and equipment; wheels; skateboard wheels; snowboard; yo-yo; spinning top; fan; and/or Frisbee.

The motorized assembly 17 and the object 18 may each contain one or more release coupling mechanisms $15_{1-n}$ configured to electrically couple with one or more an extension elements $16_{1-n}$. Release coupling mechanisms $15_{1-n}$ may include a cavity into which the extension element 16 is be inserted. Within the cavity, the release coupling mechanism 15 may include a release coupling mate, which is capable of making an electrical connection between the release coupling mechanism 15 and an end of the extension element 16, and as such the extension element may contain one or more wires for the electrical connection. In some embodiments, the extension element(s) $16_{1-n}$ may include one or more LEDs, so that the extension element(s) $16_{1-n}$ may be illuminated. The one or more LEDs may be a multicolor LED, red LED, green LED, blue LED, yellow LED, purple LED, white LED, IR LED, UV LED, or any combination thereof. In other embodiments, the extension element(s) $16_{1-n}$ may be a length of light pipe; in still other embodiments, the extension element(s) $16_{1-n}$ may be a length of optical fiber material. Each extension element 16 may have a first end 22 and a second end 24. In some embodiments, the first end 22 and/or second 24 ends of the extension element 16 may be configured to be coupled with a release coupling mechanism 15 that includes a release coupling mate capable of making an electrical connection; while in other embodiments, the first end 22 and/or second 24 ends of the extension element 16 may be configured to be coupled with a release coupling mechanism 15 with a terminating element (i.e. no electrical connection beyond that point); however, a release coupling mate may be optically connected with such a terminating element through the extension element 16. In some embodiments, the release coupling mate of the release mechanism 15 may be capable of transmitting light through the extension element 16. Furthermore, in some embodiments, a first extension element $16_{1-n}$ may be capable to interconnecting with a second extension element $16_{1-n}$.

When the device 10 is activated by a user through the user-actuated control 13 the circuitry disposed within housing 12 is closed, resulting in the power source providing power the motorized assembly 17. Once powered, the motorized assembly 17, object 18, and any extension element $16_{1-n}$ coupled thereto may rotate about an axis that runs vertically through the center of the housing 12. In some embodiments, the speed of the rotation may vary depending on the amount of power provided by the power source, which in some instances may be controlled by a user. Additionally, activation of the user-actuated control 13 may also result in powering the one or more LEDs within the device 10 become illuminated.

In some embodiments, extension element(s) $16_{1-n}$ may be constructed of a flexible of semi-flexible material; while in other embodiments, the extension element $16_{1-n}$ may be constructed of a rigid material. The length of the extension element(s) $16_{1-n}$ may vary. In some embodiments, the extension element(s) $16_{1-n}$ may additionally include a diffuser and/or diffusing material. In some embodiments, the extension element(s) $16_{1-n}$ may include a frosted portion, or may be entirely frosted; in contrast, in other embodiments, the extension element(s) $16_{1-n}$ may include a translucent portion, or may be entirely translucent. In some embodiments, the extension element(s) $16_{1-n}$ may additionally be constructed of a reflective material. In other embodiments, the extension element(s) $16_{1-n}$ may have a rough exterior surface.

In some embodiments, the device 10 may further include a communication device 26, which may include a communication transmitter/receiver device; a control device; a power source; a controlling, executing, or operating software application that may be utilized to control or operate a control device or communication transmitter/receiver device; an LED light; a switch or a sensor; and/or circuitry to control an LED light. The communication device 26 may, if present, receive or transmit various electronic signals, such as GPS, Wi-Fi, satellite, radio wave, Bluetooth, RFID, sonar, proximity detections signals, audio, sonic, vibration, light, sound, and/or infrared. The communication device 26 may be located within, or attached to, the housing 12 of the device 10, or in some instances, the communication device 26 may be in other positions embedded within the device 10. Additionally, a remote control device may be utilized and remote from the device 10, the control device being, in some implementations, a remote control, computer, tablet, smart phone, other smart device, sound device, public address (PA) system, audio system, amplifier system, or one or more speakers. Where present, the remote control device, which may be defined as an electronic device used to wirelessly control another electronic device, may include a button or other signal that when initiated may send a signal to the communication device 26. For example, the communication device 26 may receive instructions for a specialized illumination sequence when instructed or when proximity to a particular location is detected. Alternatively, complete illumination instructions may be transmitted by a remote controlling device and received by communication device 26 based upon the device's location, time of day, or other requirements and/or characteristics.

In some embodiments, the device 10 may also include a speaker, other audio device, or a vibrating device. In some embodiments, the device 10 may further include an additional switch, sensor, and/or sensing element, and this additional switch, sensor, and/or sensing element may provide a signal with each rotation or partial rotation of the motorized assembly 17 about an axis that runs vertically through the center of the housing 12. In such instances, a sound, voice, vibration, and/or pattern of illumination may be synchronized with this signal. In some embodiments, the additional switch, sensor, and/or sensing element may incorporate activation through embedded instructions and or receipt of activation signals received by the housing 12 and included circuitry. For example, the housing 12 may include a receiver for receiving signals which may activate the illumination features of the device. The switch or other circuit may further incorporate proximity detection devices, such as for example RFID or other types of electronics which senses location, proximity or other wireless instructions which would indicate or instruct illumination. Such device may include instructions and circuitry operable to detect location in respect to a transmitted beacon. For example, the device may automatically activate upon nearing a display, feature, attraction or other location within an amusement park which is transmitting a unique beacon which, when received by the device, causes the device to illuminate in a predetermined manner. Other automated instructions may further be implemented such as emitting colors, playing predefined audio stored in memory of the device or received by the receiver of the device, playing signals, which are streamed and received by the integrated receiver, and similar functionality.

For example, the device may include a proximity detection which includes a Bluetooth beacon receiver. Upon receipt of a unique beacon signal, the device may be programmed by instructions stored in memory to activate in a particular manner and/or play specific pre-recorded or streamed audio signals. Alternatively, the device may incorporate RFID detectors wherein the device, upon recognition of a specific RFID signal, begins emitting a predetermined sequence of signals. Other implementations may be implemented such as GPS location detection and determination.

As described herein, the upper portion 20 of the customizable light-up device 10 rotates, which can be dangerous for users, specifically children. To ensure that the upper portion stops rotating when a user touches it, the inventors discovered a novel slip-clutch system. This system stops the rotating of the upper portion of the device while the motor continues to run. Advantageously, the electrical connections of the device are maintained even when the top portion stops rotating. The user thereby advantageously enjoys the other electrical features of the device, such as the illumination of LEDs located thereon even when the top portion stops rotating.

Figure 19:
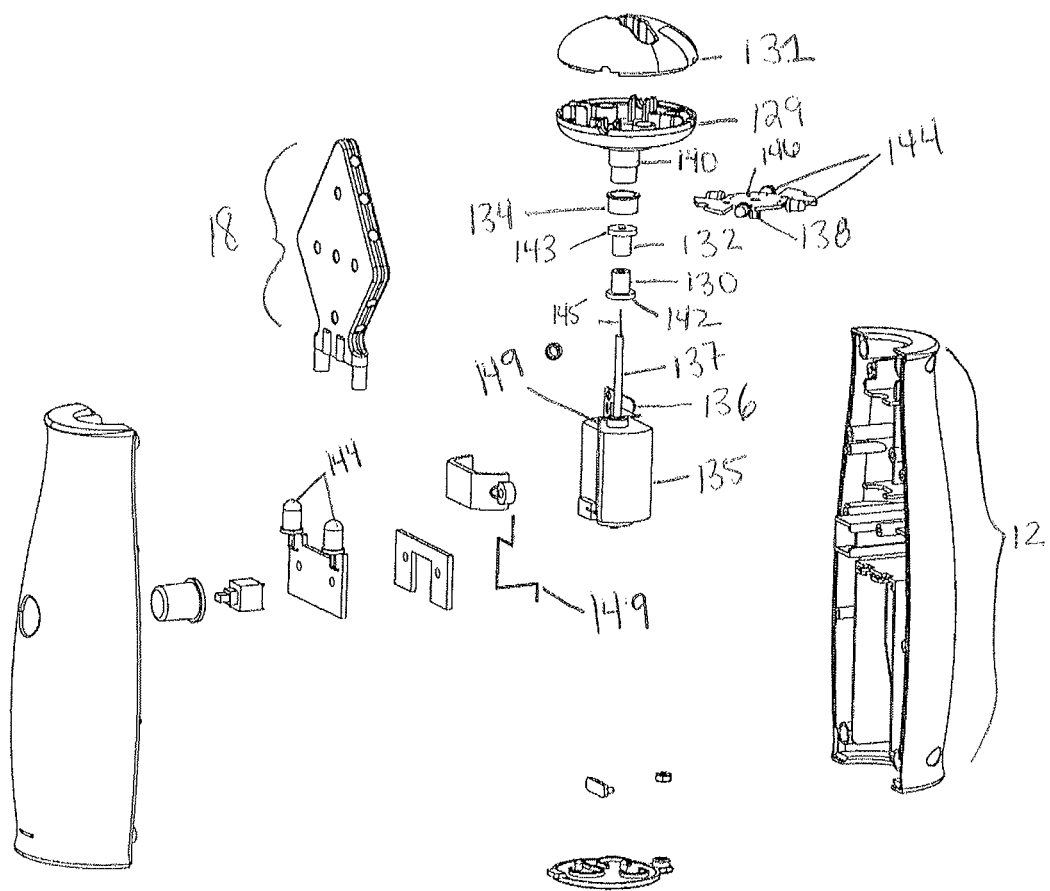
FIG. 19 illustrates an exploded view of the handheld customizable light-up device with a slip clutch system.
Figure 20:
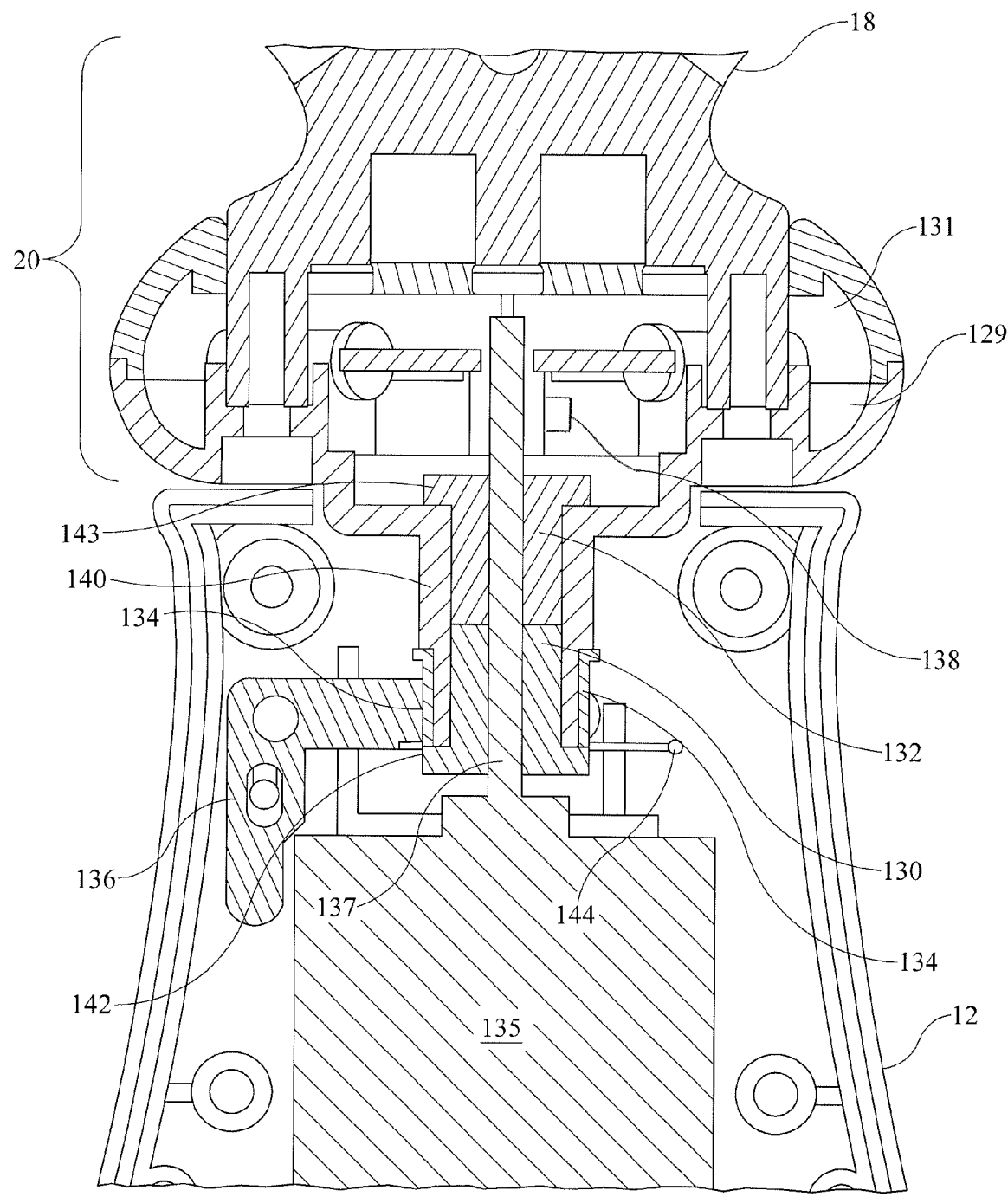
FIG. 20 illustrates a front, cross-section view of the housing, motorized assembly and object of the handheld customizable light-up device.
Figure 21:
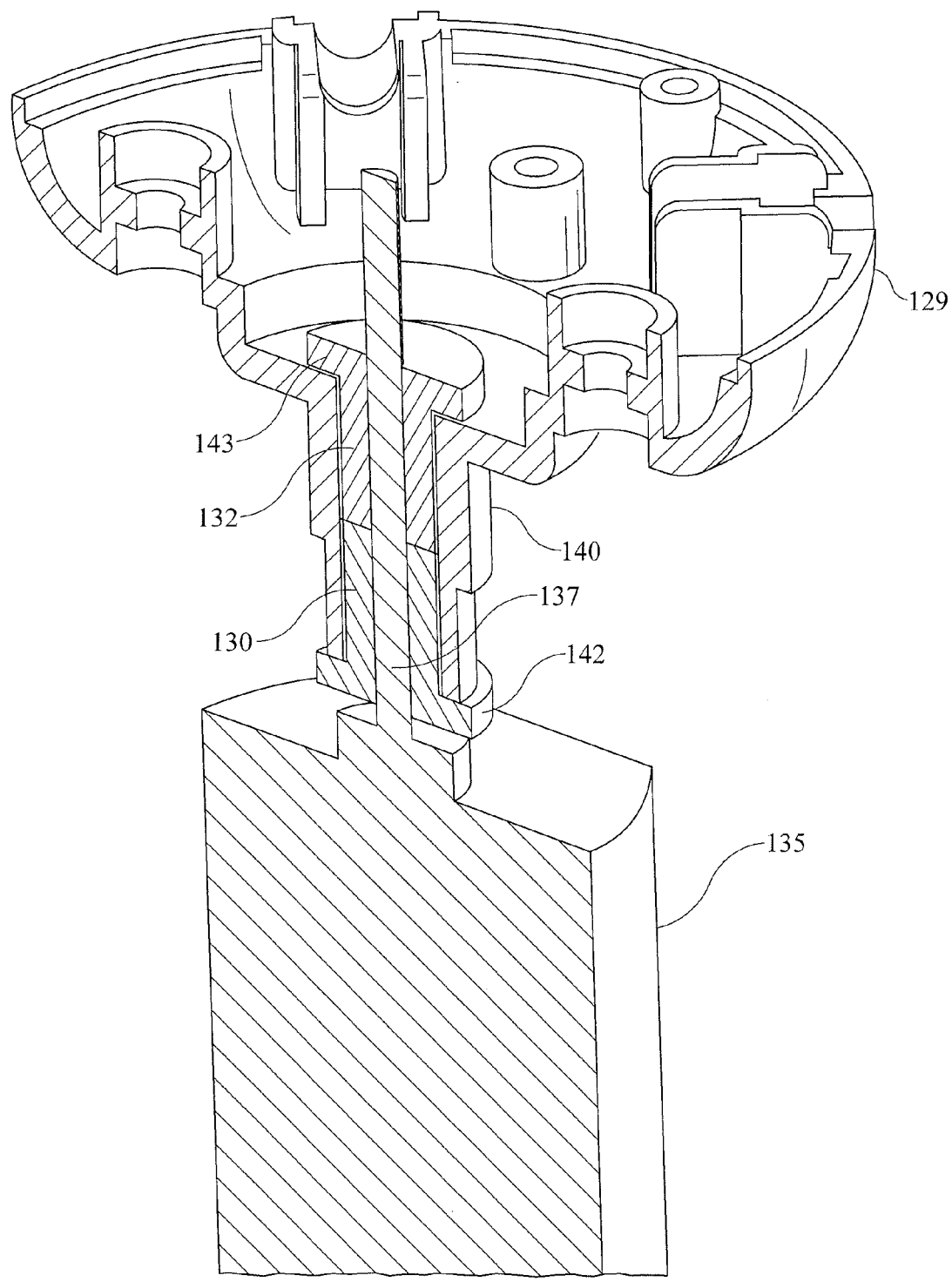
FIG. 21 illustrates a side, perspective cross-section view of the motor, first and second bushings and base of the motorized assembly of the handheld customizable light-up device.
Figure 22:
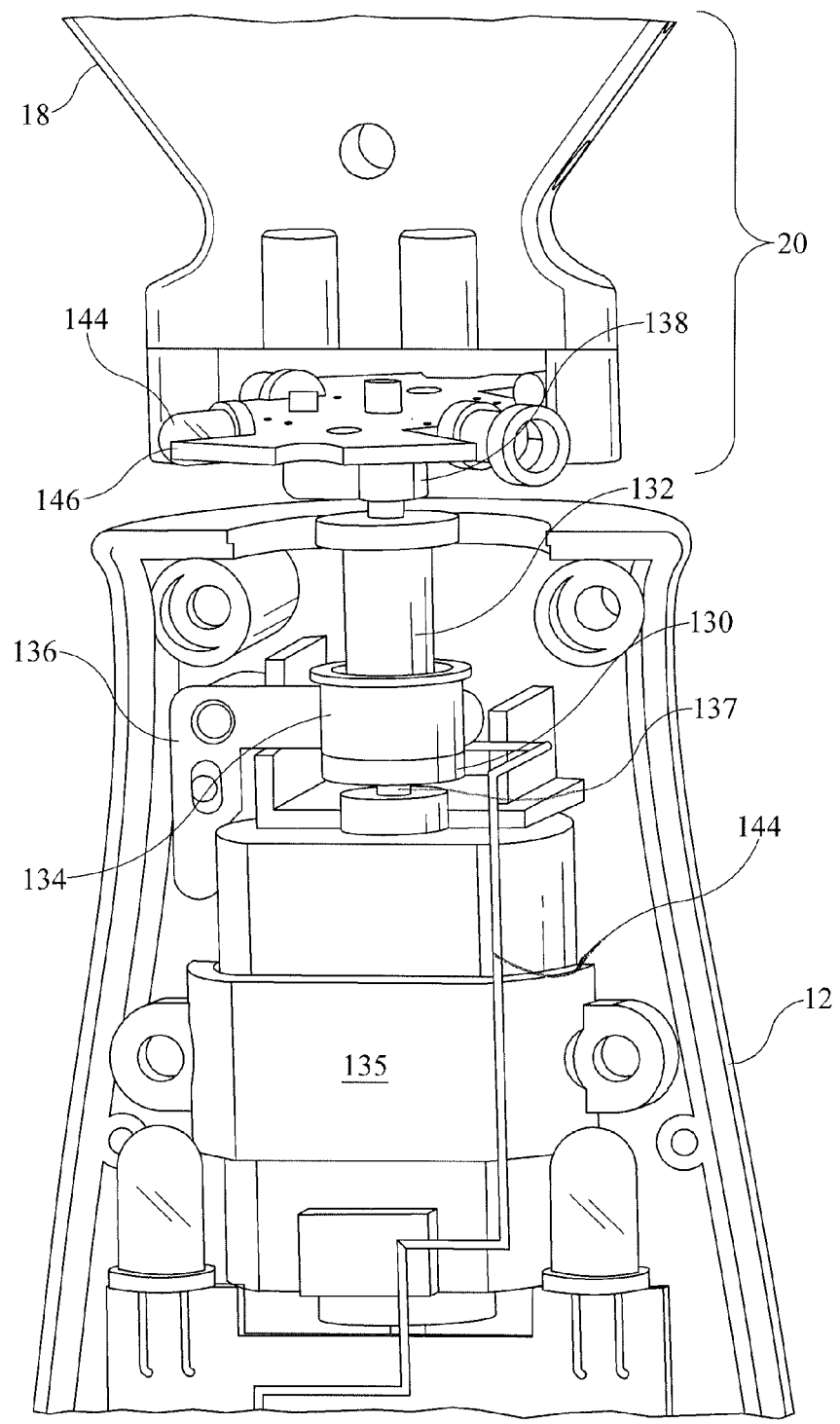
FIG. 22 illustrates a front, open view of the handheld customizable light-up device without the motorized assembly.
Figure 23:
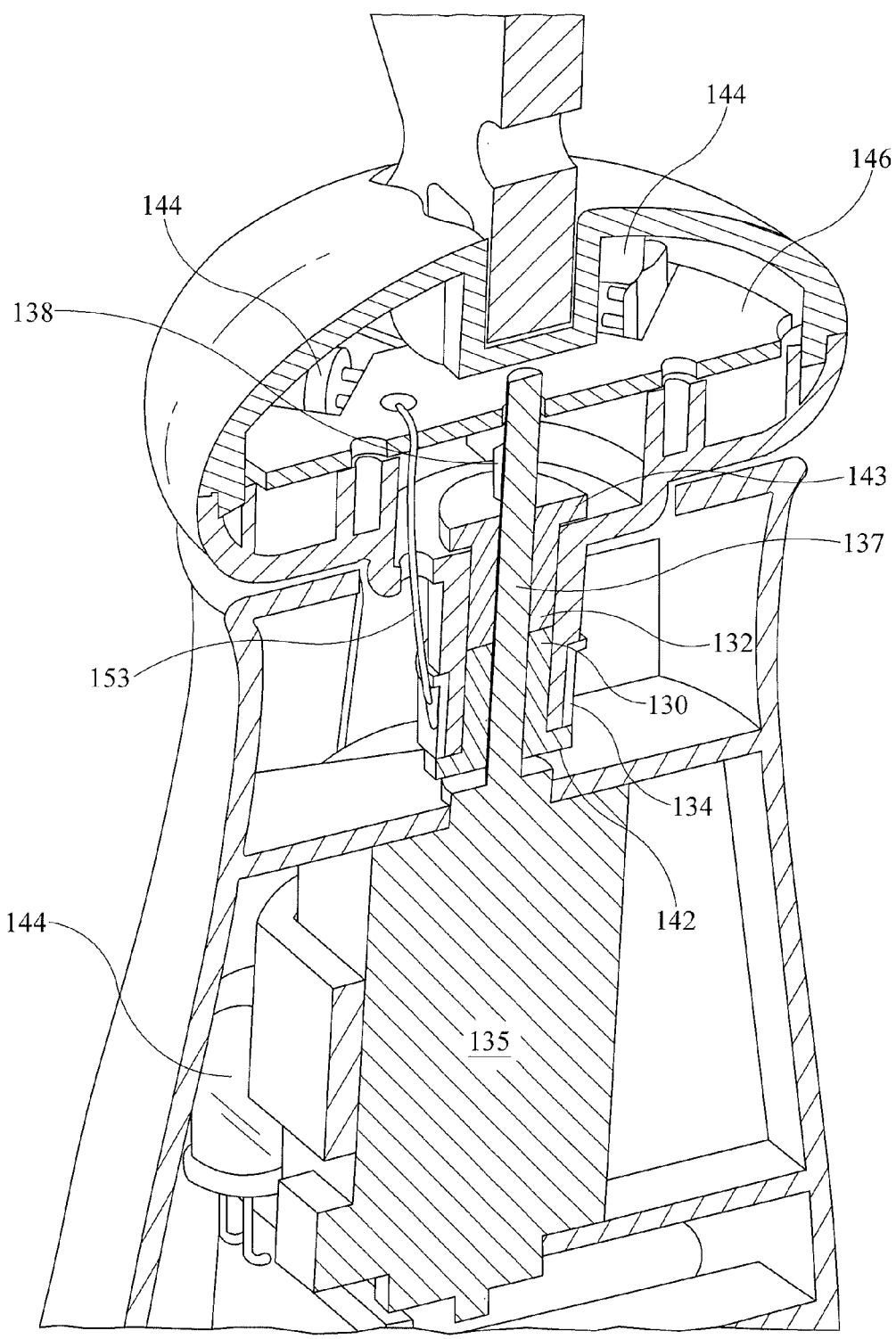
FIG. 23 illustrates a side perspective, cross section view of the handheld customizable light-up device without the first conductive plate.

As shown in FIGS. 19, 20 and 23, the slip clutch system includes a first and second bushing 130, 132, a slip ring 134 and a first and second flexible electrically conductive metal plate 136, 138. Although the slip clutch system is only shown in combination with the handheld customizable light-up device, it is to be understood that it is operational with all other embodiments disclosed herein.

As shown in FIGS. 19-21 and 23, the motorized assembly 17 is enclosed and includes a base 129 and a cover 131 that connects thereto. The housing 12 includes a motor 135 with a shaft 137 extending therefrom into the motorized assembly. This shaft extends through hollow centers of the connected first and second bushings 130, 132 of the slip clutch system. The bushings are shaped such that they are mirrored counterparts of one another so, when connected, they form a single, uniform piece, as shown in FIGS. 20-22 and 23. The first and second bushings are secured around the motor shaft with the second bushing secured above the first bushing. The bushings combine to form one piece around the shaft and act as one piece with the shaft thereby rotating together. In other embodiments, only one or no bushings are utilized. For instance, if the motor shaft is made of a conductive material, the bushings are superfluous, and the first conductive plate is connected directly to the motor shaft.

As shown in FIGS. 19-20 and 23, the base 129 of the motorized assembly 17 has a region 140 that extends downward over the outside of both the bushings, thereby surrounding them. The extending region is thereby secured in place around the bushings by upper 143 and lower edges 142 of said bushings 130, 132. The extending region squeezes the bushings, so when the device is operating normally and the top portion 20 is rotating, the extending region and the motorized assembly rotate at the same rate as the bushings and the shaft 137 of the motor. However, when a user stops the rotating of the upper portion of the device, the extending region slips thereby gripping the bushings less tightly. The bushings and the shaft continue to rotate, while the upper portion slips and stops rotating. Essentially the motor, motor shaft with the bushings continue to rotate while the extending region of the motorized assembly slips and stops rotating. Advantageously, the motor keeps the same acceleration and speed and limits the maximum toque applied to the motorized assembly. This has the added benefit of protecting the motor from overheating when a user stalls or stops the upper portion of the device.

The inventors also discovered a novel way to maintain all the electrical connections of the device 10 even when the upper portion 20 stops rotating. The device contains numerous LEDs 144 located therein, whether it be within the housing 12 on the upper portion of the device. Even when the device stops rotating, the user enjoys the illuminating features of the device. As shown in 19-20 and 22-23, the slip clutch system further includes a slip ring 134 and a first and second electrically conductive plate 136, 138. These conductive plates are preferably flexible and made of metal. The slip ring is connected around the first bushing 130 in the housing 12 and is secured tightly thereto so the slip ring rotates at the same speed as the bushing and does not rotate independently thereof. The slip ring is made of any conductive material, preferably metal and connects to the bushing for instance via a slip fit method. The slip ring further works in combination with the first conductive metal plate. The first metal plate is secured to an inner surface of the housing, for instance via screws and always maintains an electrical connection with the slip ring, whether the device is rotating or not. Wiring 144 runs from a battery located within the housing, preferably a positive terminal of the battery, and connects to the first conductive plate, for instance via soldering, for instance to a bottom portion of the plate. The first conductive plate is in constant connection with the slip ring. As shown in FIG. 23, a second wire 153 is attached to the slip ring, for instance via soldering and additionally electrically connects to a printed circuit board of an LED structure 146 secured within the motorized assembly 17. Since the slip ring is fixed to the motor shaft 137 and the LED structure is screwed on top of this shaft, the printed circuit board and the slip ring always move as one piece, so the wiring does not get tangled. Accordingly, even when the device stops rotating, the LEDs in the housing and the motorized assembly remain illuminated due in part to power supplied from the slip ring and the first metal plate.

The second metal plate 138 performs in a similar fashion as the first metal plate 136 and maintains the electrical connection between the power source and the LEDs 144 located within the device. As shown in FIGS. 19-20 and 22-23, the second plate is connected to the LED structure 146 that is secured within the motorized assembly 17. This LED structure preferably includes a printed circuit board to which the LEDs are secured and electrically connected. To maintain the electrical connection of these LEDs when the motorized assembly stops rotating, the second metal plate is secured to the LED structure, preferably a bottom surface thereof, and maintains an electrical connection with the metal motor shaft. Wiring 145 runs from a battery located within the housing, preferably from a negative terminal of the battery, through the hollow motor shaft to which it is internally connected and connects the second plate, for example, via soldering. The second plate maintains a constant connection with the motor shaft so when the motorized assembly stops rotating, the second plate still maintains an electrical connection to illuminate the LEDs in the motorized assembly and the housing.

It is to be understood that the description of technology herein, is not limited to the handheld device 10 described with reference to FIG. 1-9. Other embodiments may be recognized to one of skill in the art. For example, FIGS. 10-18 illustrate various additional embodiments of the technology described herein.

Figure 10:
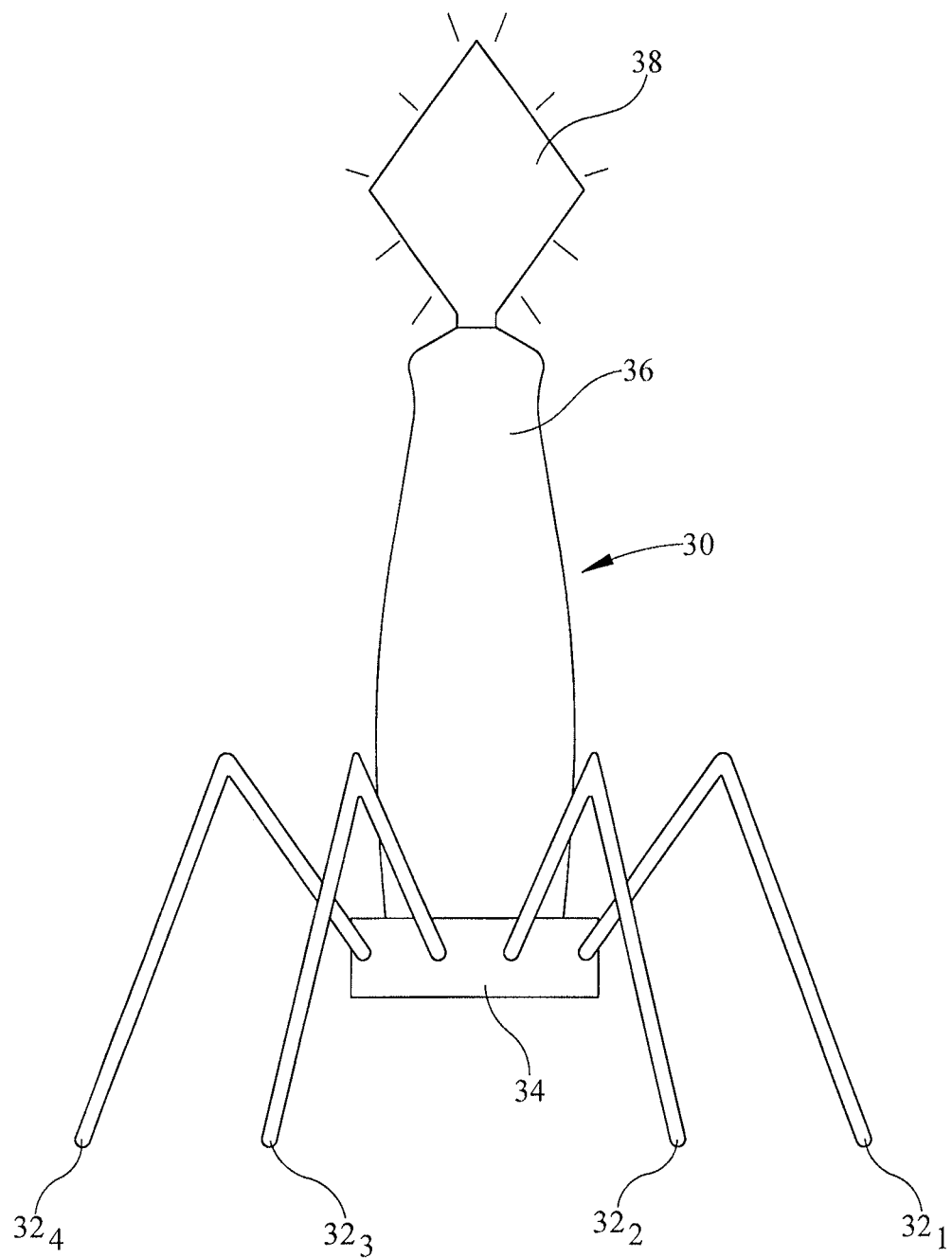
FIG. 10 illustrates an embodiment of a handheld customizable light-up device with a stand assembly consistent with the description herein.

FIG. 10 illustrates an embodiment of a standing device 30, similar to the device 10 described herein with reference to FIGS. 1-9, with a plurality of legs $32_{1-n}$ and a stand assembly 34 from which the legs $32_{1-n}$ extend. Similar to the device 10 previously described, the standing device 30 includes a housing 36, which may additionally include a user-actuated control (not illustrated in FIG. 10), a motorized assembly, and one or more LEDs configured to illuminate at least a portion of the device 10. Affixed to the motorized assembly may be an object 38 that is capable of radiating or transmitting light, or otherwise being illuminated. Although not illustrated in FIG. 10, this embodiment may also include one or more extension elements previously described.

Figure 11:
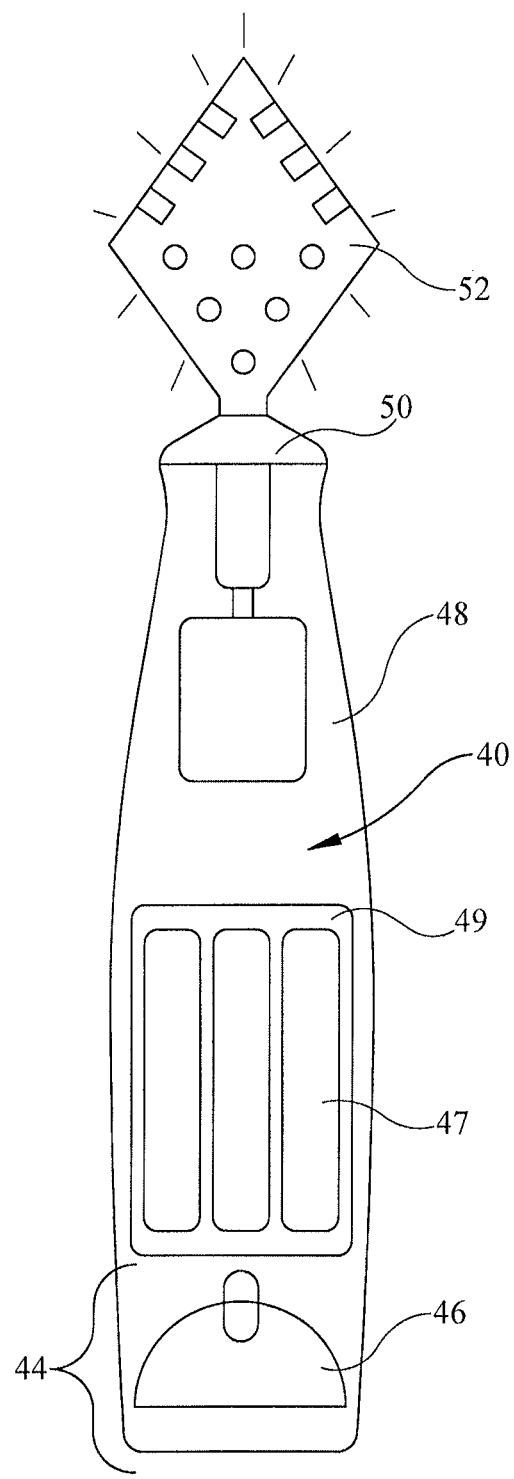
FIG. 11 illustrates an embodiment of a handheld customizable light-up device with a projection device consistent with the description herein.

FIG. 11 illustrates an embodiment of a projection device 40, similar to the device 10 described herein with reference to FIGS. 1-9, but also including a projection assembly 44. The projection assembly 44 is an optical device that is capable of projecting an image, or a moving image, onto a surface. In some embodiments, the projection assembly 44 may create this image(s) by shining a light through a small transparent lens 46; while in other embodiments, a laser may be used to project the image(s). Although the projection assembly 44 is illustrated in FIG. 11 as projecting from an end of the device 40, this is not to be understood as limiting, as the projection assembly 44 may be disposed in additional locations within the device 40, and may project out other locations, for example a side of the device 40. Similar to the device 10 previously described, the projection device 40 includes a housing 48, which may additionally include a user-actuated control (not illustrated in FIG. 11), a motorized assembly 50, and one or more LEDs configured to illuminate at least a portion of the device. Affixed to the motorized assembly may be an object 52 that is capable of radiating or transmitting light, or otherwise being illuminated. Although not illustrated in FIG. 11, this embodiment may also include one or more extension elements previously described. Finally, FIG. 11 additionally illustrates a power source compartment 49 containing within it batteries 47 capable of powering the device.

Figure 12:
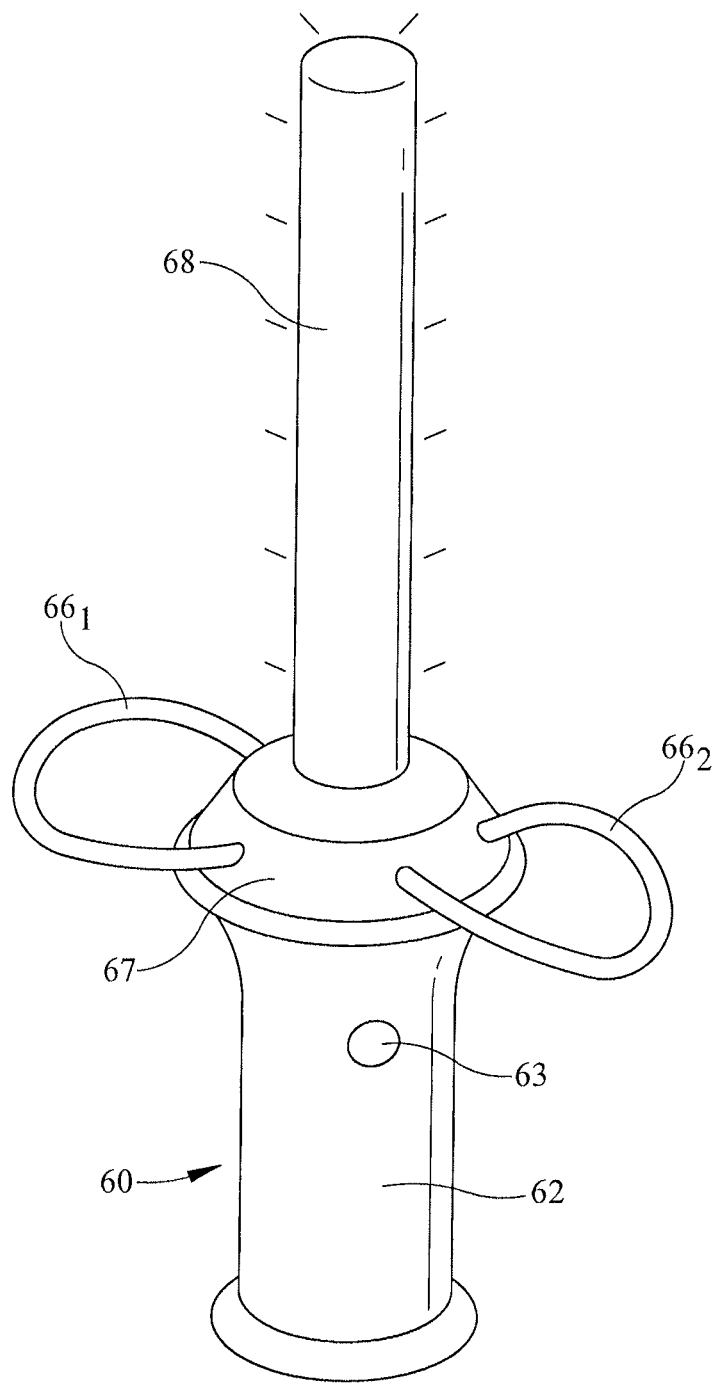
FIG. 12 illustrates another exemplary embodiment of a handheld customizable light-up device consistent with the description herein.

FIG. 12 illustrates an embodiment of a handheld customizable light-up sword device 60, similar to the device 10 described herein with reference to FIGS. 1-9. Whereas the object 18 of the embodiment illustrated in FIG. 1-9 is in the shape of a diamond, the object 68 of the embodiment illustrated in FIG. 12 is in the form of a sword. Similar to the embodiment illustrated in FIGS. 1-9, the sword device 60 includes a housing 62, with a user-actuated control 63, a motorized assembly 67, and one or more extension elements $66_{1-n}$. Also similar to the embodiment described with reference to FIGS. 1-9, the user-activated control 63 may be coupled with circuitry (not illustrated) disposed within the housing 62, such that when the user-actuated control 63 is activated or deactivated this circuitry is closed or opened. Such circuitry may connect to the power source, a motor (not illustrated) contained within the motorized assembly 67, and one or more light emitting diodes (LEDs) configured to illuminate at least a portion of the device 60.

Figure 13:
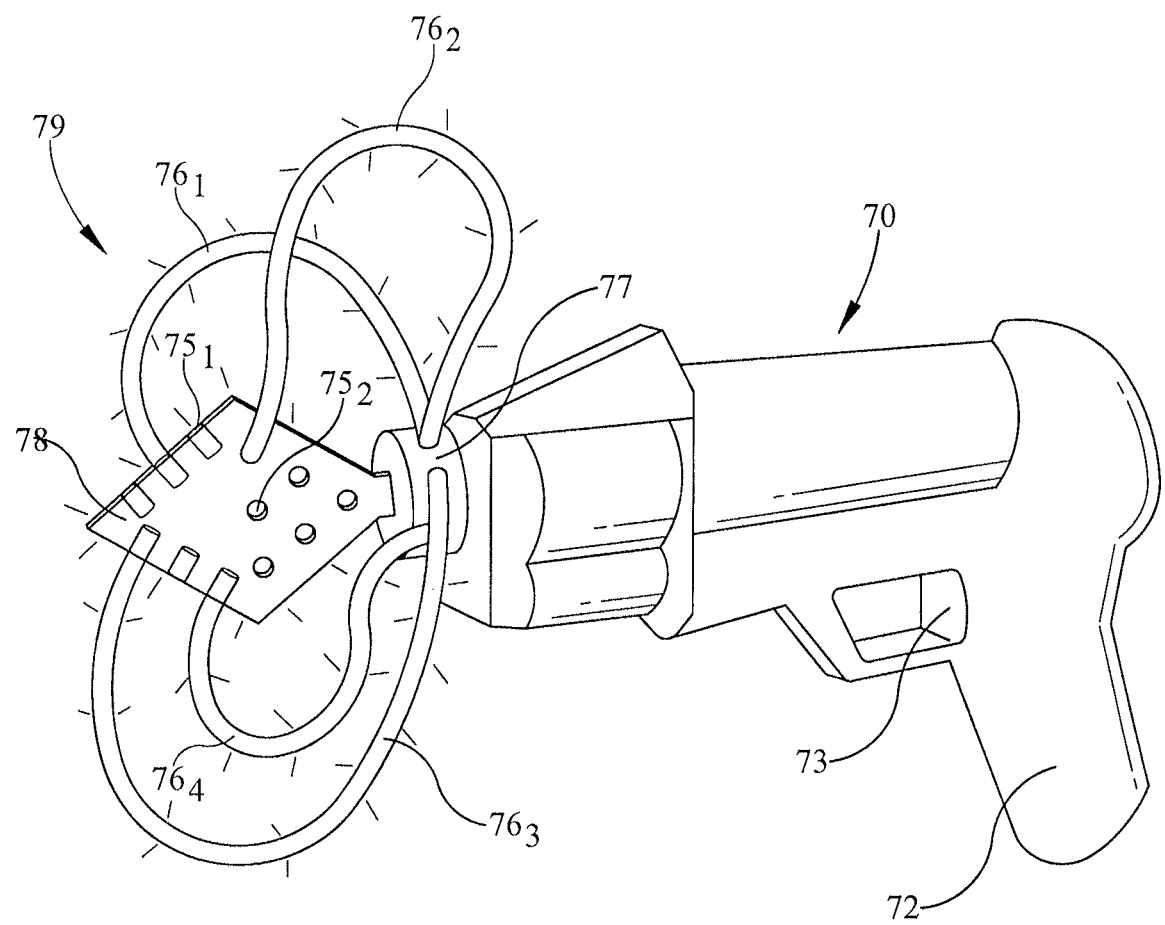
FIG. 13 illustrates another exemplary embodiment of a handheld customizable light-up device consistent with the description herein.

FIG. 13 illustrates an embodiment of a handheld customizable light-up toy gun device 70, similar to the device 10 described herein with reference to FIGS. 1-9. In such an embodiment, the toy gun device 70 includes a housing 72 and a side portion 79, which may be analogous to the upper portion 20 of the device 10 illustrated in FIGS. 1-9. The housing 72 may function as a grip for a user. Included in the housing 72 may a user-actuated control 73 that functions as an on/off switch for the device 70. In some embodiments, the user-actuated control 73 may be in the form a trigger, such that when depressed by a user, the device 70 is activated. The device 70 may also include a motorized assembly 77 and one or more light emitting diodes (LEDs) included within the motorized assembly. The side portion 79 of the device 70 may include the motorized assembly 77, which may be configured to rotate about an axis that runs horizontally through the center of the housing 72. The motorized assembly 77 may contain within it one or more LEDs (not illustrated). Affixed to the motorized assembly 77 may be an object 78 that is capable of radiating or transmitting light, or otherwise being illuminated. As detailed previously, in some embodiments, the object 78 may be glass, plexiglass, acrylic, resin, or a combination thereof. The object 78 may contain one or more release coupling mechanisms $75_{1-n}$ configured to electrically couple with one or more an extension elements $76_{1-n}$. Release coupling mechanisms $75_{1-n}$ include a cavity into which an extension element 76 may be inserted. Within the cavity, the release coupling mechanism 75 may include a release coupling mate which is capable of making an electrical connection between the release coupling mechanism 75 and an end extension element 76; and, as such the extension element 75 may contain one or more wires facilitating this electrical connection. In some embodiments, the extension element(s) $76_{1-n}$ may additionally include one or more LEDs capable of illuminating the extension element(s) $76_{1-n}$.

Figure 14:
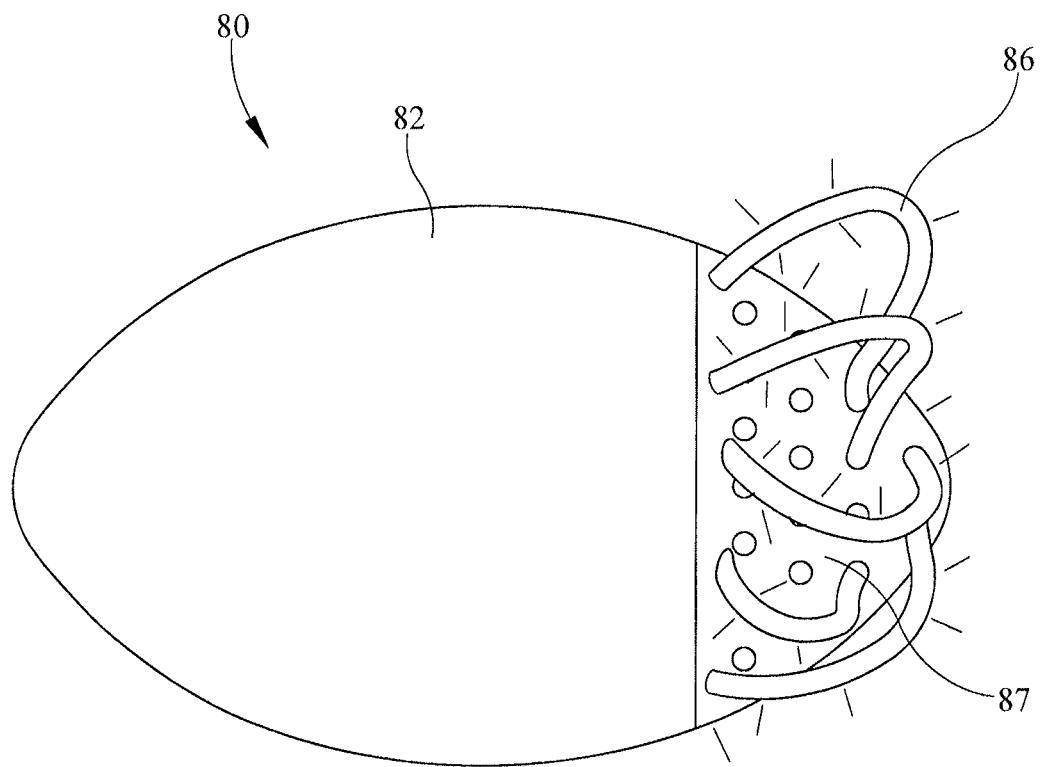
FIG. 14 illustrates another exemplary embodiment of a customizable light-up device in the form of a ball consistent with the description herein.

FIG. 14 illustrates an embodiment where the device 80 in the form of a ball. In such an embodiment, the housing 82 and the motorized assembly 87 may each be semi-spheroid, such that a complete spheroid is formed when the housing 82 and motorized assembly 87 are connected. In this embodiment, when a user throws the ball device 80 the motorized assembly 87, and any extension element(s) 86 attached thereto, may move in an opposite direction to the direction in which the ball device 80 is moved.

Figure 15:
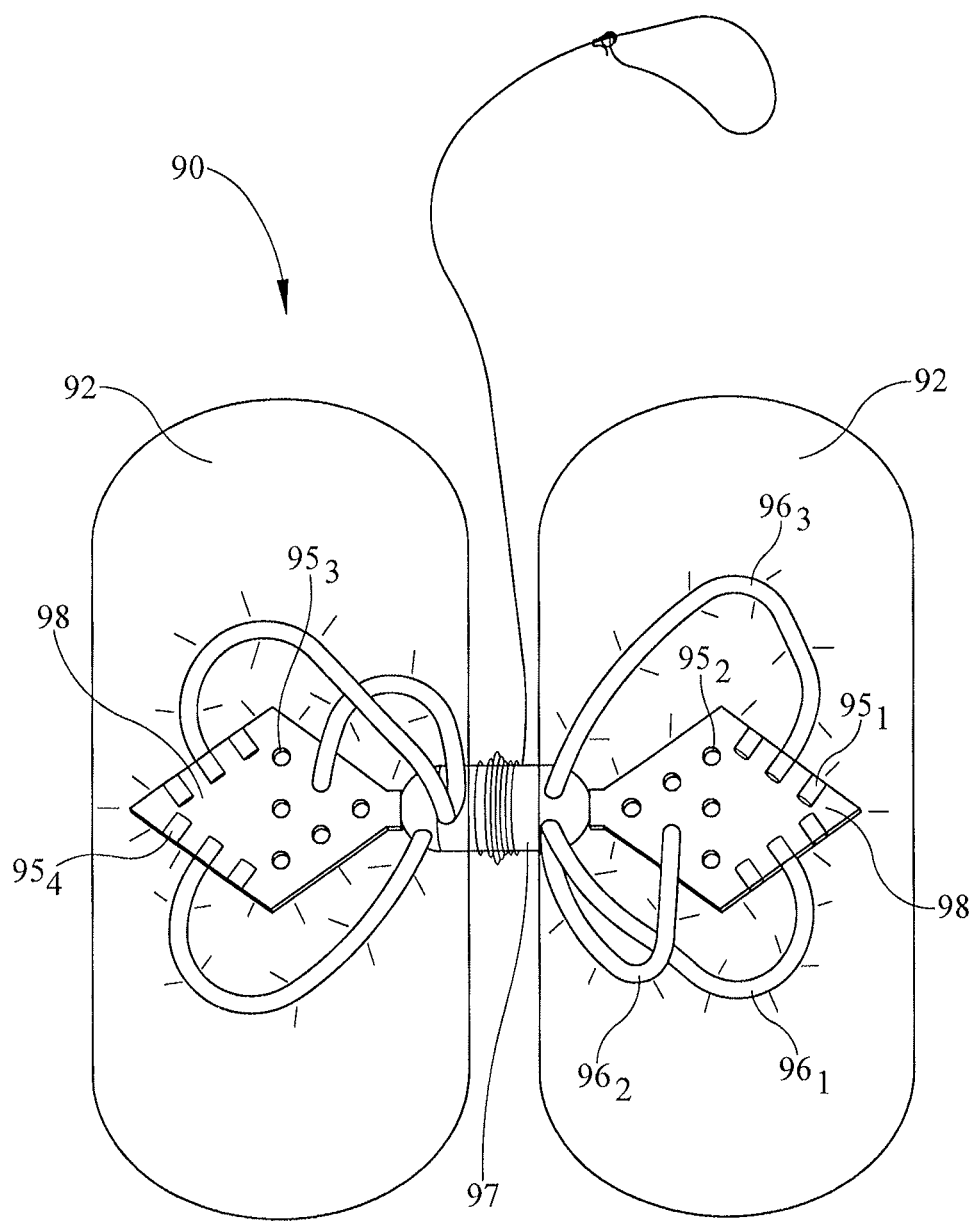
FIG. 15 illustrates another exemplary embodiment of a handheld customizable light-up device in the form of a yo-yo consistent with the description herein.

FIG. 15 illustrates an embodiment where the device 90 is in the form of a yo-yo toy. In such an embodiment, there may be two housings 92, each functioning as one side of the yo-yo. In some instances, these housings 92 may be constructed of a translucent material, so as to allow the interior contents to be visible to a user. Contained within each of the housings 92 may be an object 98, similar to the object 18 described in reference to FIGS. 1-9. A single motorized assembly 97 may, in this embodiment, couple with each of a pair of objects 98 contained within the housings 92. Similar to other embodiments described herein, the object 98 may further include one or more release coupling mechanisms $95_{1-n}$ configured to electrically couple with one or more an extension elements $96_{1-n}$. The objects 98 may be capable of radiating or transmitting light, or otherwise being illuminated. In some embodiments, the extension element(s) $96_{1-n}$ may additionally include one or more LEDs capable of illuminating the extension element(s) $96_{1-n}$.

Figure 16:
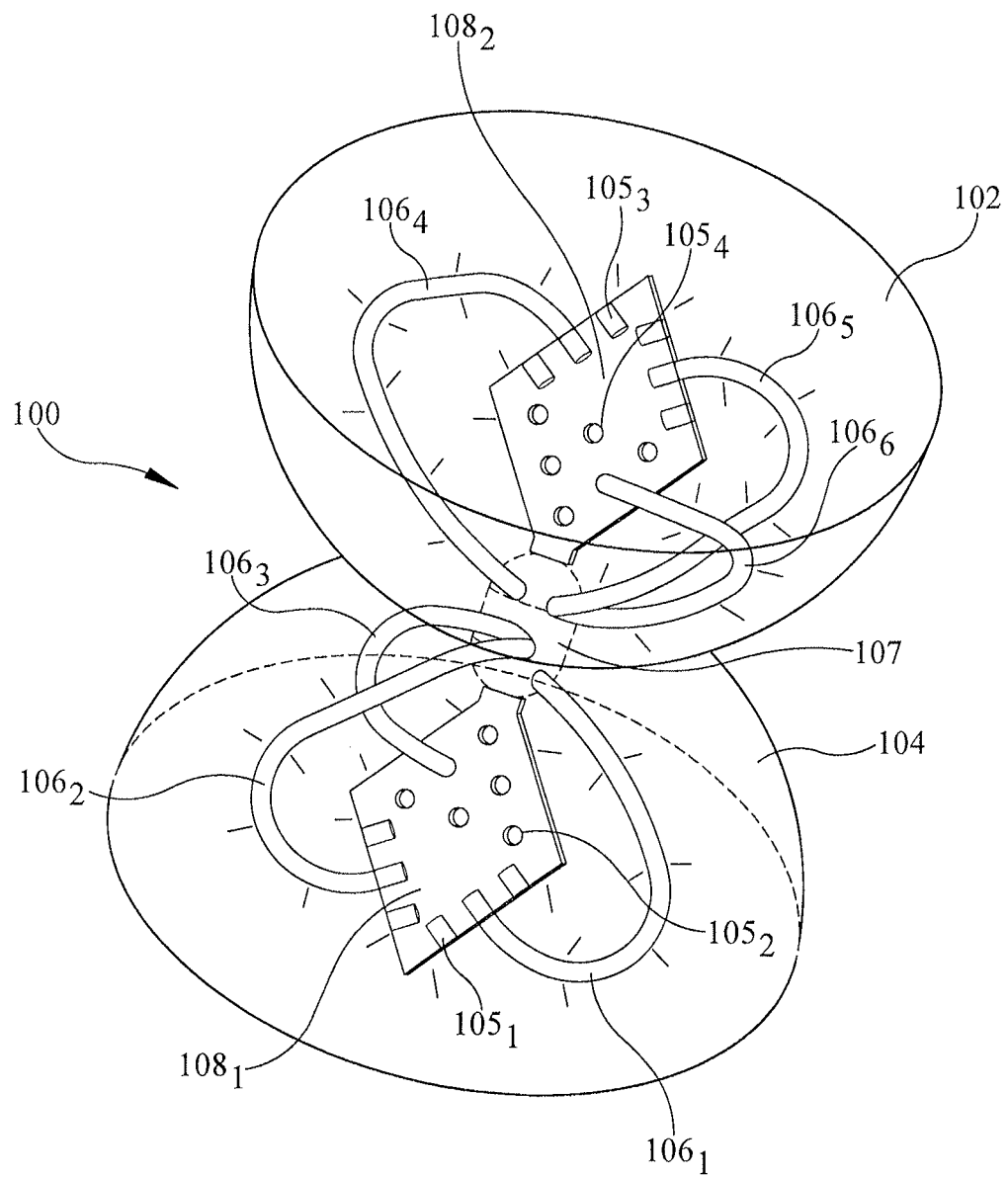
FIG. 16 illustrates another exemplary embodiment of a handheld customizable light-up device in the form of a diabolo consistent with the description herein.

In other embodiments, the components described herein may take the form of a diabolo device 100, such as illustrated in FIG. 16. Similar to a yo-yo, a diabolo is a juggling or circus prop consisting of an axle or bobbin and two cups. In the embodiment illustrated in FIG. 16, the diabolo may include two cups 102, 104, at least two objects $108_{1-n}$, similar to the object 18 described in reference to FIGS. 1-9, and motorized assembly 107 coupling the objects $108_{1-n}$ and the cups 102, 104. Similar to other embodiments described herein, the objects $108_{1-n}$ may further include one or more release coupling mechanisms $105_{1-n}$ configured to electrically couple with one or more an extension elements $106_{1-n}$.

Figure 17:
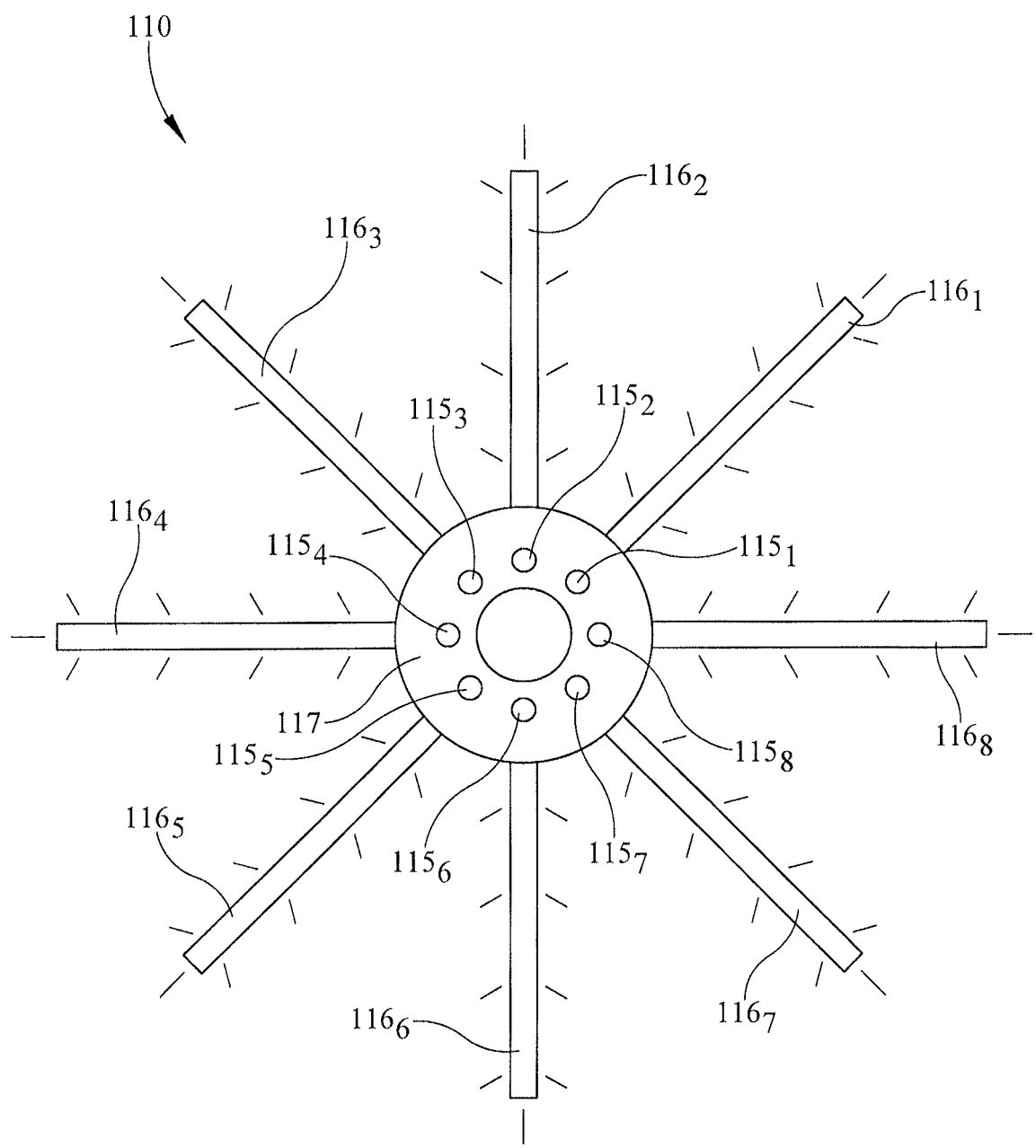
FIG. 17 illustrates another exemplary embodiment of a wearable customizable light-up device consistent with the description herein.
Figure 18:
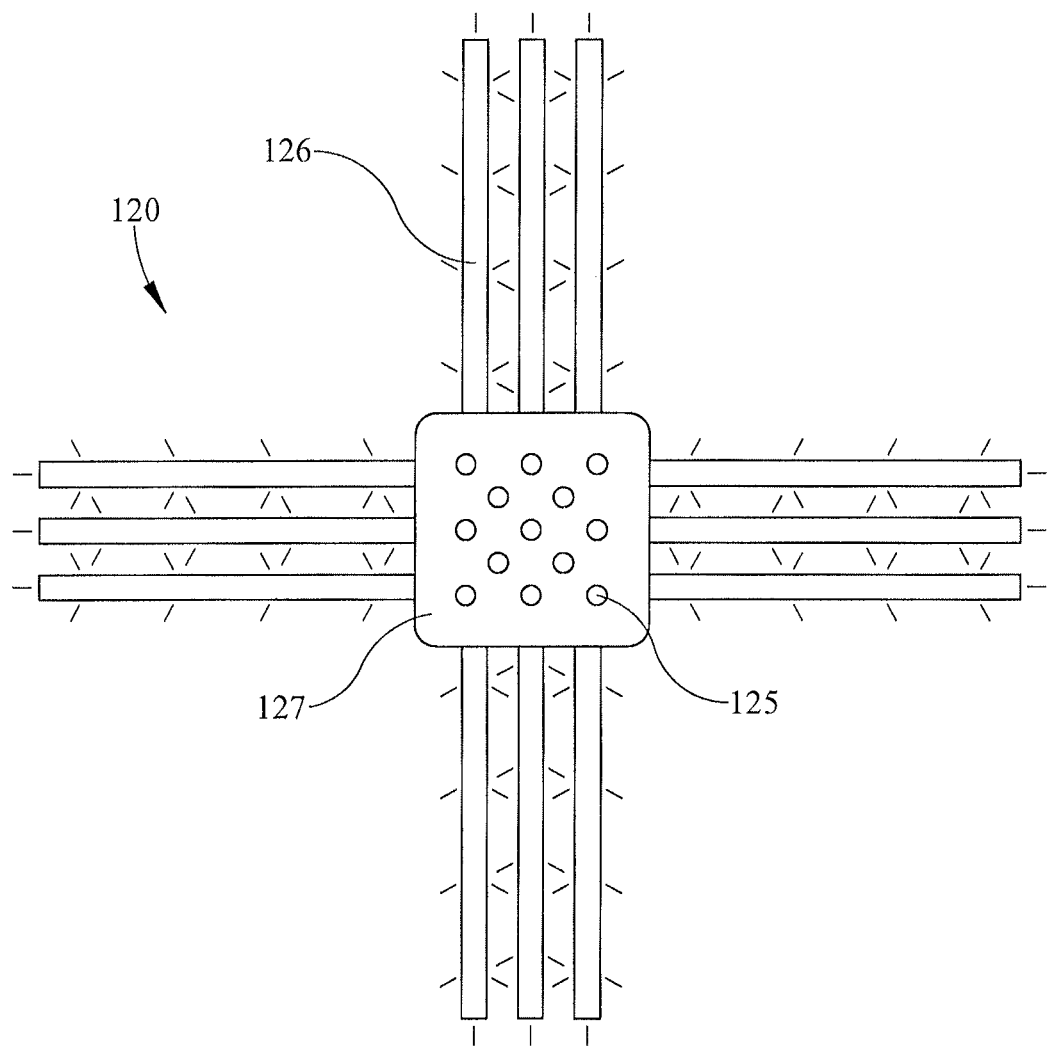
FIG. 18 illustrates another exemplary embodiment of a wearable customizable light-up device consistent with the description herein.

In other embodiments, the components described herein may be utilized as a part of various fashion accessories including, but not limited to jewelry (e.g. bracelets, necklaces, and/or the like), such as illustrated in FIG. 17, or a hairpiece, such as illustrated in FIG. 18. In the embodiment illustrated in FIG. 17, extension elements $116_{1-n}$, assembly 117, and release coupling mechanism(s) $115_{1-n}$ are created such that the connection of an extension element(s) 116 to the motorized assembly 117 to create a wearable device 110. In the embodiment illustrated in FIG. 18, the extension element(s) $126_{1-n}$, assembly 127, and release coupling mechanism(s) $125_{1-n}$ are created such that the connection of the extension element(s) $126_{1-n}$, to the assembly 127 and/or release coupling mechanism(s) $125_{1-n}$ may be worn in, connected to, or affixed to a user's hair, thus creating a hair piece 120.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification, unless clearly indicated to the contrary, should be understood to mean "at least one."

The phrase "and/or," as used herein in the specification, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus comprising:
a housing containing a motor electrically connected to a power source;
an enclosed motorized assembly connected to the housing and containing secure points located in an outer surface thereof and LEDs therein;
a slip ring secured around a motor shaft of the motor;
a first conductive plate electrically connected to the slip ring and the LEDs;
an object affixed to the motorized assembly and containing insertion points, wherein the object radiates or transmits light from the LEDs and wherein the object and motorized assembly rotate about an axis;
a second conductive plate electrically connected to the motor shaft and the LEDs; and
a plurality of extension elements comprising a first end and a second end, wherein the first end is secured to the secure points of the enclosed motorized assembly and wherein the extension elements radiate or transmit light from the LEDs.

2. The apparatus of claim 1, wherein the housing further contains LEDs.

3. The apparatus of claim 1, wherein at least one of the plurality of extension elements includes a length of a light pipe and/or a length of a fiber optic material.

4. The apparatus of claim 1, wherein the slip ring is further secured around a bushing, which bushing is secured around the motor shaft.

5. The apparatus of claim 1 further comprising a user-actuated control operable to adjust power provided by the power source.

6. The apparatus of claim 5, wherein the user-actuated control is a software or signal controlled switch controlled by an internal controller.

7. The apparatus of claim 1, further comprising circuitry enclosed within the housing, which circuitry is electrically connected to the power source, motor and the LEDs, wherein the circuitry signals and lights one or more of the LEDs and/or signals and engages the motor to rotate the object and the motorized assembly.

8. The apparatus of claim 7, wherein the circuitry is communicatively activated by a remote device.

9. The apparatus of claim 7, further comprising a communication device enclosed within the housing, wherein the communication device includes a receiver and a proximity detector; and
wherein the circuitry is operable to respond based on a signal received by the receiver or a location detected by the proximity detector.

10. An apparatus comprising:
a housing containing a motor electrically connected to a power source;
an enclosed motorized assembly connected to the housing and containing secure points located in an outer surface thereof and LEDs therein;
a slip ring secured around a motor shaft of the motor;
a first conductive plate electrically connected to the slip ring and the LEDs;
an object affixed to the motorized assembly and containing insertion points, wherein the object radiates or transmits light from the LEDs and wherein the object and motorized assembly rotate about an axis;
a second conductive plate electrically connected to the motor shaft and the LEDs; and
a plurality of extension elements comprising a first and second end, wherein the first end is secured to the secure points of the motorized assembly and the second end is inserted into one of the insertion points in the object; wherein the plurality of extension elements are configured to radiate or transmit light from the LEDs.

11. The apparatus of claim 10, wherein the housing further contains LEDs.

12. The apparatus of claim 11, wherein the first conductive plate is further electrically connected to the LEDs of the housing.

13. The apparatus of claim 10, wherein the slip ring is further secured around a bushing, which bushing is secured around the motor shaft.

14. The apparatus of claim 10, further comprising circuitry enclosed within the housing, which circuitry is electrically connected to the power source, motor and the LEDs, wherein the circuitry signals and lights one or more of the LEDs and/or signals and engages the motor to rotate the object and the motorized assembly.

15. The apparatus of claim 14, wherein the circuitry is communicatively activated by a remote device.

16. The apparatus of claim 14, further comprising a communication device enclosed within the housing, wherein the communication device includes a receiver and a proximity detector; and wherein the circuitry is operable to respond based on a signal received by the receiver or a location detected by the proximity detector.

17. An apparatus comprising:

a housing containing a motor electrically connected to a power source;

an enclosed motorized assembly connected to the housing and containing secure points located in an outer surface thereof and LEDs therein;

a slip ring secured around a motor shaft of the motor;

a first conductive plate electrically connected to the slip ring and the LEDs;

an object affixed to the motorized assembly and containing insertion points, wherein the object radiates or transmits light from the LEDs and wherein the object and motorized assembly rotate about an axis;

a second conductive plate electrically connected to the motor shaft and the LEDs;

a plurality of extension elements comprising a first and second end, wherein the first end is secured to the secure points of the enclosed motorized assembly and the second end is inserted into one of the insertion points in the object; wherein the plurality of extension elements are configured to radiate or transmit light from the LEDs;

and a communication device enclosed within the housing, wherein the communication device comprises a receiver and a proximity detector.

18. The apparatus of claim 17, wherein the housing further contains LEDs.

19. The apparatus of claim 18, further comprising circuitry enclosed within the housing, which circuitry is electrically connected to the power source, motor and the LEDs contained in the apparatus, wherein the circuitry signals and lights one or more of the LEDs contained in the apparatus and/or signals and engages the motor to rotate the object and the motorized assembly.

20. The apparatus of claim 19, wherein the circuitry is operable to respond based on a signal received by the receiver or a location detected by the proximity detector.

* * * * *